United States Patent
Payette et al.

(10) Patent No.: US 9,621,607 B2
(45) Date of Patent: Apr. 11, 2017

(54) SYSTEMS AND LANGUAGES FOR MEDIA POLICY DECISION AND CONTROL AND METHODS FOR USE THEREWITH

(71) Applicant: NetScout Systems Texas, LLC, Westford, MA (US)

(72) Inventors: Roxsan Payette, Ville Lorraine (CA); Michael Archer, Cambridge (CA); Michael Gallant, Kitchener (CA)

(73) Assignee: NetScout Systems Texas, LLC, Plano, TX (US)

( * ) Notice: Subject to any disclaimer, the term of this patent is extended or adjusted under 35 U.S.C. 154(b) by 221 days.

(21) Appl. No.: 14/474,456

(22) Filed: Sep. 2, 2014

(65) Prior Publication Data

US 2015/0089026 A1   Mar. 26, 2015

Related U.S. Application Data

(63) Continuation-in-part of application No. 14/453,378, filed on Aug. 6, 2014, which is a continuation of application No. 13/894,797, filed on May 15, 2013, now abandoned, and a continuation-in-part of application No. 13/631,366, filed on Sep. 28, 2012.

(60) Provisional application No. 61/915,498, filed on Dec. 12, 2013, provisional application No. 61/646,990, (Continued)

(51) Int. Cl.
| | |
|---|---|
| *G06F 15/16* | (2006.01) |
| *H04L 29/06* | (2006.01) |
| *H04L 29/08* | (2006.01) |
| *H04L 12/923* | (2013.01) |
| *H04L 12/927* | (2013.01) |

(52) U.S. Cl.
CPC ............ *H04L 65/60* (2013.01); *H04L 47/762* (2013.01); *H04L 65/605* (2013.01); *H04L 67/1025* (2013.01); *H04L 67/141* (2013.01); *H04L 47/801* (2013.01); *H04L 47/805* (2013.01)

(58) Field of Classification Search
CPC ... H04L 65/60; H04L 65/605; H04L 67/1025; H04L 47/762; H04L 67/141; H04L 47/805; H04L 47/801
See application file for complete search history.

(56) References Cited

U.S. PATENT DOCUMENTS

2005/0228892 A1* 10/2005 Riley .................. H04L 12/5695
709/228
2006/0089938 A1* 4/2006 Leonard .................. H04L 12/24
(Continued)

*Primary Examiner* — Brian J Gillis
*Assistant Examiner* — Michael A Keller
(74) *Attorney, Agent, or Firm* — Locke Lord LLP; Scott D. Wofsy; Christopher J. Capelli

(57) ABSTRACT

A system includes a policy repository configured to store a plurality of media-centric policies. A media policy decision point is configured to execute operational instructions in accordance with a media centric policy language to select at least one of the plurality of policies corresponding to one of the plurality of media sessions based on, for example, feedback extracted monitoring the plurality of media sessions. The media-centric policy language, in various embodiments, expresses at least one of: operator preferences, operator goals, or operator constraints, facilitates management of individual ones of the plurality of media sessions and/or facilitates management of aggregate media traffic over the plurality of media sessions.

11 Claims, 10 Drawing Sheets

Related U.S. Application Data filed on May 15, 2012, provisional application No. 61/541,046, filed on Sep. 29, 2011.

(56) References Cited

U.S. PATENT DOCUMENTS

| | | | | |
|---|---|---|---|---|
| 2006/0092269 A1* | 5/2006 | Baird | ............... | H04L 12/1822 348/14.08 |
| 2008/0307040 A1* | 12/2008 | So | ..................... | G06Q 10/10 709/203 |
| 2009/0231415 A1* | 9/2009 | Moore | ................ | H04N 7/152 348/14.09 |
| 2011/0169907 A1* | 7/2011 | Bozionek | .......... | H04N 21/4886 348/14.01 |

* cited by examiner

```
policy_rule_expr:   rule NAME [condition logical_expr] [action action_expr] |
                    policy_rule_expr
    .
    .
logical_expr:       unary_expr | binary_expr
unary_expr:         basic_expr | not basic_expr
binary_expr:        logical_expr or logical_expr | logical_expr and logical_expr
basic_expr:         boolean_expr | relational_expr | ( logical_expr )
boolean_expr:       true | false
equality_op:        == | !=
numeric_op:         equality_op | > | >= | < | <=
relational_expr:    session_expr | video_expr | audio_expr | application_expr | subscriber_expr |
                    device_expr | network_expr | flow_expr | ...
    .
    .
session_expr:       media-bitrate numeric_op INTEGER |
                    quality-score numeric_op DOUBLE |
                    clip-duration numeric_op INTEGER |
                    streamed-duration numeric_op INTEGER |
                    time-of-day-expr | day-of-week-expr | ...

video_expr:         video-codec equality_op VIDEO_CODEC |
                    video-codec-profile equality_op VIDEO_CODEC_PROFILE |
                    video-bitrate numeric_op INTEGER |
                    video-resolution numeric_op VIDEO_RESOLUTION | ...

audio_expr:         audio-codec equality_op AUDIO_CODEC |
                    audio-codec-profile equality_op AUDIO_CODEC_PROFILE |
                    audio-bitrate numeric_op INTEGER |
                    audio-channels numeric_op INTEGER |
                    audio-sampling-rate numeric_op INTEGER | ...

application_expr:   streaming-protocol equality_op STREAMING_PROTOCOL |
                    container-type equality_op CONTAINER_TYPE |
                    media-site equality_op STRING |
                    server-ip equality_op IP_ADDRESS | ...
```

FIG. 6A

```
subscriber_expr:   subscriber-ip equality_op IP_ADDRESS |
                   imsi equality_op STRING |
                   imei equality_op STRING |
                   msisdn equality_op STRING |
                   subscriber-plan equality_op STRING |
                   subscriber-quota numeric_op QUOTA | … device_expr: device-category equality_op DEVICE_CATEGORY |
             device-operating-system equality_op DEVICE_OPERATING_SYSTEM |
             display-size numeric_op INTEGER |
             display-resolution numeric_op INTEGER |
             player equality_op MEDIA_PLAYER | … location_expr, network_expr: access-type equality_op ACCESS_TYPE |
                             location equality_op NETWORK_LOCATION |
                             aggregated-bitrate numeric_op INTEGER |
                             aggregated-quality-score numeric_op DOUBLE |
                             subscriber-count numeric_op INTEGER |
                             media-session-count numeric_op INTEGER |
                             location-congested equality_op boolean_expr | … flow_expr: transport-protocol equality_op TRANSPORT_PROTOCOL |
           port-number equality_op INTEGER |
           source-ip equality_op IP_ADDRESS |
           destination-ip equality_op IP_ADDRESS |
           vlan equality_op INTEGER |
           apn equality_op INTEGER |
           tos-dscp equality_op INTEGER | …
  .
  .
  .
action_expr: permit | deny |
             mark network-layer tos TOS_MASK TOS_VALUE |
             mark network-layer dscp DSCP_CODE_POINT |
             stream-control target-quality-score DOUBLE method S_C_METHOD [s_c_option] |
             stream-control target-bitrate INTEGER method S_C_METHOD [s_c_option] |
             transcode target-quality-score DOUBLE [transcode_option] |
             transcode target-bitrate INTEGER [transcode_option] | …
  .
  .
  .
transcode_option: video-codec VIDEO_CODEC,
                  video-height INTEGER,
                  video-width INTEGER,
                  video-frame-rate DOUBLE,
                  audio-codec AUDIO_CODEC,
                  audio-channels INTEGER,
                  audio-sampling-rate INTEGER
```

FIG. 6B

```
rule qoe-normalization
    condition (time-of-day between 12h00 and 13h15) or
              (time-of-day between 14h30 and 14h45) or
              (time-of-day between 17h00 and 16h15)
    action transcode target-quality-score 3.0 group root
    service-policy
        rule qoe-normalization
```

FIG. 7

```
rule HLSstreamControl
    condition streaming-protocol is http-live-streaming-all
    action stream-control target-quality-score 3.0 method police
rule NetflixStreamControl
    condition streaming-protocol is netflix-streaming
    action stream-control target-quality-score 3.5 method police
rule SilverlightSSStreamControl
    condition streaming-protocol is silverlight-smooth-streaming-all
    action stream-control target-quality-score 3.5 method police group root
    match-type match-any
    service-policy
        rule HLSstreamControl, SilverlightSSStreamControl, NetflixStreamControl
```

FIG. 8

SYSTEMS AND LANGUAGES FOR MEDIA POLICY DECISION AND CONTROL AND METHODS FOR USE THEREWITH

CROSS REFERENCE TO RELATED APPLICATIONS

The present U.S. Utility patent application claims priority pursuant to 35 U.S.C. §120 as a continuation-in-part of U.S. Utility application Ser. No. 14/453,378, entitled SYSTEMS FOR MEDIA POLICY DECISION AND CONTROL AND METHODS FOR USE THEREWITH, filed Aug. 6, 2014, which claims priority pursuant to 35 U.S.C. §119(e) to U.S. Provisional Application No. 61/915,498, entitled A POLICY ENGINE FOR MULTIMEDIA SERVICES IN IP NETWORKS, filed Dec. 12, 2013, both of which are hereby incorporated herein by reference in their entirety and made part of the present U.S. Utility patent application for all purposes.

U.S. Utility application Ser. No. 14/453,378 also claims priority pursuant to 35 U.S.C. §120 as a continuation-in-part of U.S. Utility application Ser. No. 13/631,366, entitled SYSTEMS AND METHODS FOR MEDIA SERVICE DELIVERY, filed on Sep. 28, 2012, which claims priority pursuant to 35 U.S.C. §119(e) to U.S. Provisional Application No. 61/541,046, entitled METHOD AND SYSTEM FOR IP VIDEO SERVICE DELIVERY, filed on Sep. 29, 2011, both of which are hereby incorporated herein by reference in their entirety and made part of the present U.S. Utility patent application for all purposes.

U.S. Utility application Ser. No. 14/453,378 also claims priority pursuant to 35 U.S.C. §120 as a continuation-in-part of U.S. Utility application Ser. No. 13/894,797, entitled METHODS AND SYSTEMS FOR DYNAMIC POLICY EVALUATION, filed on May 15, 2013, which claims priority pursuant to 35 U.S.C. §119(e) to U.S. Provisional Application No. 61/646,990, entitled SYSTEM AND METHOD FOR DYNAMIC POLICY EVALUATION, filed on May 15, 2012; both of which are hereby incorporated by reference in their entirety and made part of the present U.S. Utility patent application for all purposes.

TECHNICAL FIELD OF THE INVENTION

The present invention relates to streaming video distribution in mobile networks and other networks.

DESCRIPTION OF RELATED ART

Streaming media has become an integral element of the "Internet experience" through the significant availability of content from sites like YouTube, Netflix and many others. Streaming media content poses a significant load for the organizations that provide the networks for such content to be delivered. This is both because video content requires transporting significantly more data compared to other applications and, in the case of mobile networks, because of the limited and shared nature of radio access network. Unmanaged video consumption can lead to congestion, which manifests as long startup-delays, re-buffering, and stream switches to lower quality levels for video content, degrading the overall subscriber experience. It is therefore widely accepted that it will be necessary to manage the network impact of this video traffic, in particular on mobile networks. Policy-based management of media traffic is challenging due to the heterogeneous nature of media applications, devices and client behavior, bandwidth usage patterns, and application layer protocols. There are currently no solutions for sophisticated policy-based management of media traffic.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIGS. 6A and 6B represent an embodiment of a subset of a simplified and partial grammar for a media-centric policy language.

FIG. 7 represents an embodiment of a simplified, example policy for managing media traffic during specific time periods to a target quality level FIG. 8 represent an embodiment of a simplified, example policy for managing specific types of media traffic to a target quality level

DETAILED DESCRIPTION

Figure 1:
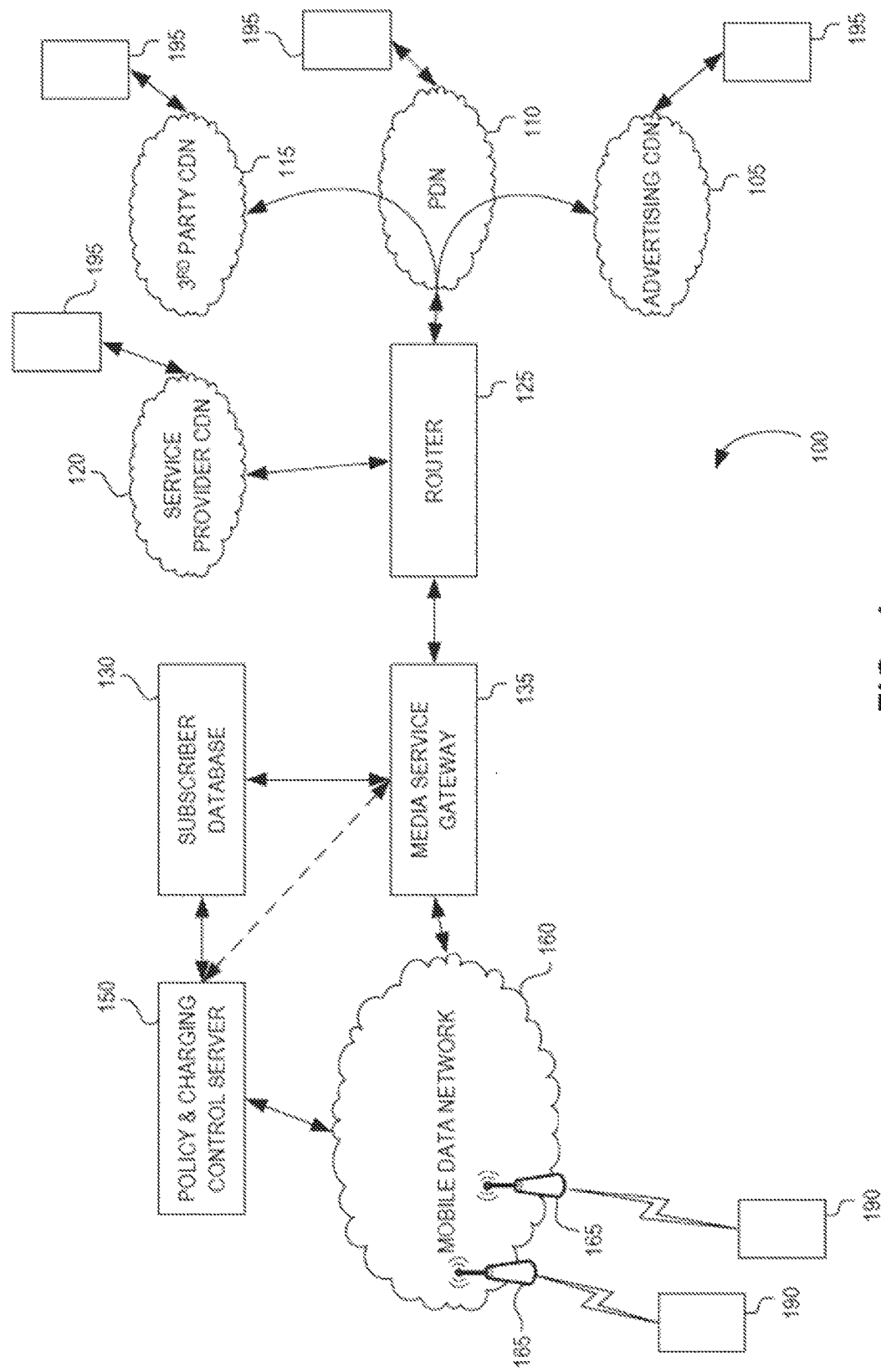
FIG. 1 is a block diagram of a network containing a media service gateway in accordance with an example embodiment.

Traditionally, the "best-effort" service model has characterized service provisioning over IP networks. With rapidly growing network size, complexity, and multi-service operation requirements, finding better ways to service provision these networks has been an ongoing problem. Policy-based management is one way to guide service-delivery in IP networks, even under a wide range of conditions. Policy-based management uses controls to enable service-based traffic management, service-level differentiation, service-specific charging models, as well as improve overall operational efficiencies. These controls are applied based on business rules defined by the network operator which can take into account subscriber, device, network and application conditions as well as other factors such as time of day. The controls are expressed via policies which are high level, declarative directives that can be dynamically introduced, checked for consistency, refined and evaluated, and typically result in a series of low-level actions.

Cisco's Visual Networking Index (VNI) report projects that mobile video traffic will become the dominant traffic component on mobile networks, growing 16-fold (75% CAGR) from 2012 to 2017, to the point where it will consume 66% of all mobile bandwidth by 2017. This growth is largely due to device proliferation, increased resolution and quality of video content, improving networks and capacity, and increasing on-demand consumption patterns. This is particularly troublesome as video traffic is well-known to put a disproportionate strain on network resources. This is both because video content requires transporting significantly more data compared to other content and, in the case of mobile networks, because of the limited and shared nature of radio access network. Unmanaged video consumption can lead to congestion, which manifests as long startup-delays, re-buffering, and stream switches to lower quality levels for video content, degrading the overall subscriber experience. It is therefore widely accepted that it will be necessary to manage the network impact of this video traffic, in particular on mobile networks, for example to deliver similar or to deliver premium QoE to subscribers.

Policy-based management of media sessions is challenging due to the heterogeneous nature of media applications, devices and client behavior, bandwidth usage patterns, and application layer protocols (on top of conventional HTTP) and, in the case of mobile networks, this is further complicated by the shared and time-varying nature of radio access networks. There are currently no solutions for sophisticated policy-based management of media traffic, in particular for mobile networks. It would be beneficial to have a system that can perform media traffic identification and make real time policy decisions, enforcing media-related actions directly to media sessions, devices, subscribers, and locations. This would allow individual decisions to be evaluated and executed for media traffic flowing through the system. There is a need for specialized, media-centric policy decision and enforcement within IP networks, particularly more constrained ones such as mobile networks.

The described embodiments may generally provide systems and methods to enable media-centric policy decision and enforcement to manage multimedia traffic in wired and wireless communication networks and to perform policy enforcement and/or other traffic optimization. Media traffic optimization is an ongoing process that includes a configurable set policy rules defined by a media-centric policy language that express operator preferences, goals to achieve, and constraints to operate within and uses continuous feedback to manage individual and aggregate media traffic and sessions.

The described methods and systems may include a media-centric policy language that permits media-centric policy decision and enforcement based on or more attributes associated with the media traffic in one or more attribute types. These attributes may be classified in specific attribute types as session attributes, video attributes, audio attributes, application attributes, subscriber attributes, device attributes, flow-based attributes and network attributes.

Session attributes may include media duration such as network time (streaming time) or application time (clip, streamed, watched duration, etc.). Session attributes may include one or more quality metrics such as a quality of experience (e.g. QoE metric), bit rate, resolution, etc. Session attributes may include a start and end time, time of day, day of week, etc. Session attributes may also include impairments such as startup delay, stalling (location, duration, frequency, etc.), etc.

Video attributes may include video codec type, video codec profile, video resolution, video bit rate, video frame rate, video operating point, etc. Similarly audio attributes may include audio codec type, audio codec profile, number of audio channels, audio bit rate, audio sampling rate, audio operating point, etc. Application attributes may include site or service (e.g. YouTube, Netflix, etc.), CDN, edge server, origin server, streaming protocol, container format, etc.

Subscriber attributes may include subscriber identifier, data plan or quota (in units of time, tonnage, etc.), subscriber tier, usage patterns, etc.

Device attributes may include display size, display resolution, device identifier, operating system, browser, user agent, media player and associated capabilities (codec, container), etc.

Network attributes may include network status (load level, congested, etc.), location identifier, access type (2G, 3G, etc.), etc.

Flow-based attributes may include conventional layer 2, layer 3, and layer 4 attributes such as VLAN identifiers, IP addresses, port numbers, protocols (e.g. TCP vs UDP), VPN tunnel, TOS values, DSCP values, etc.

Together, the session attributes, video attributes, audio attributes, and application attributes may be referred to as media-specific attributes. The subscriber attributes, flow-based attributes, network attributes, and device attributes may be referred to as non-media-specific attributes.

Reference is first made to FIG. 1, illustrating a simplified block diagram of a network capable of media service delivery 100 in accordance with an example embodiment. System 100 generally comprises a media service gateway 135, which may provide the ability to manage/control media sessions, and that interfaces between one or more packet data networks 110, such as the Internet, content delivery networks, such as 105, 115, or 120 and a mobile data network 160, which enables data communication between media servers 195 and client devices 190.

Advertising content delivery network (CDN) 105, primary delivery network 110, third party CDN 115, service provider CDN 120, and mobile data network 160 may comprise data networks capable of carrying data, such as the Internet, public switched telephone network (PSTN), or any other suitable local area network (LAN) or wide area network (WAN). In particular, mobile data network may comprise a Universal Mobile Telecommunications System (UMTS), 3GPP Long-Term Evolution Advanced (LTE Advanced) system, Worldwide Interoperability for Microwave Access (WiMAX) system, other 3G and 4G networks, and their equivalent and successor standards.

Mobile data network 160 may comprise a plurality of base transceiver stations 165, which are operable to communicate with individual client devices 190.

In the case of a "3G" implementation of mobile data network 160, using a standard such as Universal Mobile Telecommunications System (UMTS), mobile data network 160 further comprises support nodes including a serving GPRS support node (SGSN) (where GPRS stands for General Packet Radio Service) and a gateway GPRS support node (GGSN), as well as a radio network controller (RNC). Various other network elements commonly deployed in a 3G mobile data network are omitted for simplicity and clarity. Each mobile data network 160 may comprise a plurality of support nodes and radio network controllers.

In the case of a "4G" implementation of mobile data network 160 using a standard such as 3GPP Long Term Evolution (LTE), mobile data network 160 may further comprise of gateways including a serving gateway, and a packet gateway, as well as an Evolved Node B (eNodeB) and a mobile management entity (MME). Various other network elements commonly deployed in a 4G mobile data network are omitted for simplicity and clarity. Each mobile data network 160 may comprise a plurality of gateways, eNodeBs and MMEs.

Media service gateway 135 may receive data from various network elements in the mobile data network 160, for example, user plane data and control plane data. Generally, user plane data may be considered to be application data, such as media data. Conversely, control plane data may be signaling and control information used during a data communication session.

The availability of control plane data facilitates better optimization by media service gateway 135, by providing information about device mobility and location, among other things. Control plane data may be used to extract data about the client device, including location and mobility, device type (e.g., International Mobile Equipment Identity [IMEI]) and subscriber information (e.g., International Mobile Subscriber Identity [IMSI] or Mobile Subscriber Integrated Services Digital Network Number [MSISDN]). Control plane data may also reveal information about the RAN, including number of subscribers using a particular node, which can be an indicator of congestion.

In one approach, the media service gateway 135 may be deployed to be active inline of user plane date and passive in the control plane. In another approach, an inline, partial user plane traffic mode may be used (not shown), in which another inline network element (e.g., gateway or router) may redirect a subset of monitored traffic to media service gateway 135. In this approach, control plane data may or may not be available.

Accordingly, input data and statistics may be obtained from the user plane (e.g., content data) or from the control plane used for signaling information with the client device. The monitored data may be in the form of conventional Internet Protocol (IP) data traffic or in the form of tunneled data traffic using a protocol such as Generic Routing Encapsulation (GRE), GPRS Tunneling Protocol (GTP), etc.

Networks 105, 110, 115 and 120 may comprise content delivery networks. In some embodiments, one or more of networks 105, 110, 115 and 120 may be merged or incorporated into one another as part of a single network.

In general, a content delivery network comprises a plurality of nodes. Each node may have redundant cached copies of content that is to be delivered upon request. The content may be initially retrieved from a media server 195 and subsequently cached at each node according to a caching or retention policy.

CDN nodes may be deployed in multiple geographic locations and connected via one or more data links (e.g., backbones). Each of the nodes may cooperate with each other to satisfy requests for content by clients while optimizing delivery. Typically, this cooperation and delivery process is transparent to clients.

In a CDN, client requests for content may be algorithmically directed to nodes that are optimal in some way. For example, a node that is geographically closest to a client may be selected to deliver content. Other examples of optimization include choosing nodes that are the fewest number of network hops away from the client, or which have the highest current availability.

One or more client devices 190 may request media content from media servers 195 via packet data network 110. It will be appreciated that servers 195 may not be directly connected to network 110, but may be connected via intermediate networks or service providers. In some cases, servers 195 may be edge nodes of a content delivery network (CDN).

In the illustrated embodiments, client devices 190 may be any computing device, comprising a processor and memory, and capable of communication via a mobile data network. For example, client devices 190 may be a personal or portable computer, mobile device, personal digital assistant, smart phone, tablet, electronic reading device, and portable electronic devices or a combination of these. The client device 190 is generally operable to send or transmit requests for media content.

In various embodiments, the client device 190 includes a requesting client which may be a computing application, application plug-in, a widget, browser, media player or other mobile device application residing or rendered on the device 190 in order to send or transmit one or more requests.

Media server 195 may comprise one or more servers equipped with a processor and memory storing, for example, a database or file system. Media server 195 may be any server that can provide access to multimedia content, such as video and audio content in a streaming session by, for example, storing the multimedia content. The content may comprise a wide variety of content, including movies, movie clips, TV shows, TV clips, music videos, video blogging, short original videos, user-generated content, etc. Examples of media server 195 may include websites such as YouTube™ and Netflix™, etc. Media server 195 may also store a plurality of versions of the same multimedia content, such as, for example, different formats or resolutions of the same multimedia content. For example, a media server may store the same movie clip in two or more video resolutions, such as 480p, 720p, 1080i or 1080p. Likewise, the media server may store the same movie clip in two or more video formats, such as Windows Media Video or Moving Picture Experts Group MPEG-4 Advanced Video Coding (MPEG-4 AVC).

Generally, a media server 195 is operable to commence a media streaming session in response to a request for multimedia content from a client device 190, as described further herein. The request may traverse mobile data network 160 and be relayed to media service gateway 135. Media service gateway 135 may deny the request, modify it, or transmit it further to the respective media server 195 via a router 125, which connects to a suitable network for delivering the request. In some embodiments, router 125 may be incorporated into media service gateway 135, or into one or more of networks 105, 110, 115 or 120.

Media service gateway 135 may be a server system equipped with a processor and memory storing, for example, a database or file system. Although only one media service gateway 135 is shown for clarity, there may be multiple media service gateways 135 distributed over a wide geographic area and connected via, for example, a data network such as service provider CDN 120. Media service gateway 135 may further comprise a network interface for connecting to the data networks comprising system 100. In some embodiments, media service gateway 135 may be incorporated into a hardware router 125, as a software module, for example.

Media service gateway 135 is generally configured to forward data packets associated with the data sessions of each client device 190 to and from mobile data network 160, preferably with minimal latency. In some cases, as described herein further, media service gateway 135 may modify the data sessions, particularly in the case of media traffic (e.g., streaming video or audio). Media service gateway may allow a plurality of media-centric policies to be applied to one or more media sessions. In particular, the media service gateway 135 allows for a subset of a general set of media-centric policies to be associated with an individual media session, and for that subset to be dynamically evaluated through the lifetime of the media session.

Such methods and systems for applying a plurality of media-centric policies to media sessions can be implemented via a policy engine such as a stand-alone multimedia policy decision point (PDP), that is, a location where multimedia policy decisions are made, or in an integrated multimedia PDP and policy enforcement point (PEP), such as a media session control system referenced herein. In operation, quality level may change and be updated frequently (e.g. every second, every time a new data session begins or ends, etc.), given that the policy expressions may consists of several complex logical conditions, and given that the policy repository may contain a large number of policies, it would be inefficient to re-evaluate all policies after every change in the network environment.

Rather, it is generally more efficient to initially select a subset of policies that are capable and likely to be applied during the lifetime of each specific session, even if not necessarily at session start-up. Thereafter, incremental re-evaluation of the selected subset of policies can be performed when an underlying trigger changes or toggles as described later in conjunction with the figures that follow. In some embodiments described herein, a ternary or quaternary logic approach may be used to enable this, using "soft-matching" rule expressions. Further examples are described in U.S. Utility application Ser. No. 13/894,797, entitled METHODS AND SYSTEMS FOR DYNAMIC POLICY EVALUATION, filed on May 15, 2013

A distinction may be drawn between evaluating and selecting policies. Evaluating generally involves determining the result of a logical expression at a specific point in time. Selecting generally involves retaining those policies that currently evaluate as "TRUE", or which may conceivably evaluate as "TRUE" within the lifetime of a media session, and discarding those policies that will always evaluate as "FALSE" within the lifetime of the media session. Therefore, selecting implies evaluating.

Selecting further implies that substantially all policies within the general set are initially examined and those which initially do or eventually might evaluate to "TRUE" are placed within an entity which may be referred to the working set. In the presence of dynamic conditions, only policies in the working set need to be re-evaluated when an underlying condition changes.

To facilitate the selection of a working set and dynamic re-evaluation of a working set, it may be helpful to categorize attributes as slow-changing (e.g. session-static) or fast-changing (e.g. session-dynamic). Slow-changing attributes may include subscriber identity, subscriber data plan, time of day, device identity, device type and capabilities, display size, display resolution, service type, server address, clip or content duration, streaming protocol, media container, audio codec, video codec, and the like. That is, a slow-changing attribute is one that may change infrequently, or not at all, during the lifetime of a media session.

For example, one slow-changing attribute may be a device capability, such as the ability to decode media content in a selected format (e.g., H.264, H.265, etc.). The ability of a particular device to decode a specific format is generally fairly static, and this is unlikely to change during the lifetime of a media session. That is, a mobile device that is capable of decoding H.264 but not H.265 is not likely to gain the ability to decode H.265 content during the lifetime of a media session.

Fast-changing attributes are those that may change every few seconds, or sub-seconds, and may include subscriber location, location utilization load level, current audio or video bit rate, audio sampling rate, audio channels, video resolution, video frame rate, adaptive streaming operating point, current quality level or metric, and the like. Accordingly, a fast-changing attribute is one that may change frequently during the lifetime of a media session.

Quality level is an example of a fast-changing attribute. Conventionally, quality level may be assessed based on factors such as format, encoding options, resolutions and bit rates. The large variety of media applications using different options, coupled with the wide range of devices on which content may be viewed, has conventionally resulted in widely varying quality levels.

The described methods and systems, however, may apply policies to media sessions based on a more comprehensive quality metric, for example based on a quality of experience (QoE) score. In some cases, the quality metric may be in the form of a numerical score. In some other cases, the quality metric may be in some other form, such as, for example, a letter score, a descriptive (e.g. 'high', 'medium', 'low') etc. The quality metric may be expressed as a range of scores or an absolute score.

A quality metric on a Mean Opinion Score (MOS) scale is one example of a quality metric, which reflects a viewer's opinion of the quality of the media session. The terms quality metric and QoE score may be used interchangeably herein. However, a person skilled in the art will understand that other quality metrics may also be used.

A QoE score can be considered a systematic way of capturing how well a user is satisfied with a media presentation, or is likely to be satisfied. Generally, a QoE score may reflect a user's actual or anticipated viewing quality of the media session. QoE scores can be computed for the entirety of a media session, or computed periodically throughout a media session.

QoE scores may reflect the impact of one or more of the delivery network, source content, and display device on the user experience during a media session. Network effects may manifest as temporal artifacts such as startup delay, re-buffering, unexpected stream switching, etc. Content effects may manifest as spatial artifacts in the content such as blurring, blocking, noise, etc. Device effects may include display size.

Each media-centric policy may define one or more actions to be carried out when conditions are satisfied. Media-centric actions may include, for example, media-aware shaping or policing (e.g., controlling or limiting throughput), denying or terminating the media session, transcoding the media content in the media session (e.g., to change format, bitrate, resolution, frame rate, etc.), substituting media content in the media session (e.g., replacing a first video with a second video), inserting media content in the media session (e.g., advertising), request-response modification, manifest modification and various other actions.

In adaptive streaming control approaches, request-response modification may cause client segment requests for high definition content to be replaced with similar requests for standard definition content. Manifest editing may include modifying the media stream manifest files that are sent in response to a client request to modify or reduce the available operating points in order to control the operating points that are available to the client. Accordingly, the client may make further requests based on the altered manifest.

The described methods and systems generally enable a network device to evaluate and enforce media-centric policies on a large number of concurrent media sessions.

In addition, system 100 may comprise 3rd Generation Partnership Project (3GPP) Policy Control and Charging (PCC) sub-system, 150 including a subscriber database server 130, as described further herein. The media-centric policies may be tailored by specifics related to a subscriber profile or quota which may be obtainable via the PCC sub-system. In this case, media service gateway 135 may also perform some of the functions of a Policy and Charging Rules Function (PCRF), Policy Control Enforcement Function (PCEF) with Application Function (AF), or Application Detection and Control (ADC), generally in relation to the media traffic.

Although the exemplary embodiments are shown primarily in the context of mobile data networks, it will be appreciated that the described systems and methods are also applicable to other network configurations. For example, the described systems and methods could be applied to data networks using satellite, digital subscriber line (DSL) or data over cable service interface specification (DOCSIS) technology in lieu of, or in addition to a mobile data network. Accordingly, in other embodiments, access networks such as mobile data network 160 may be absent, and client devices 190 be connected to media service gateway 135 directly, or via packet data network 110.

Figure 2:
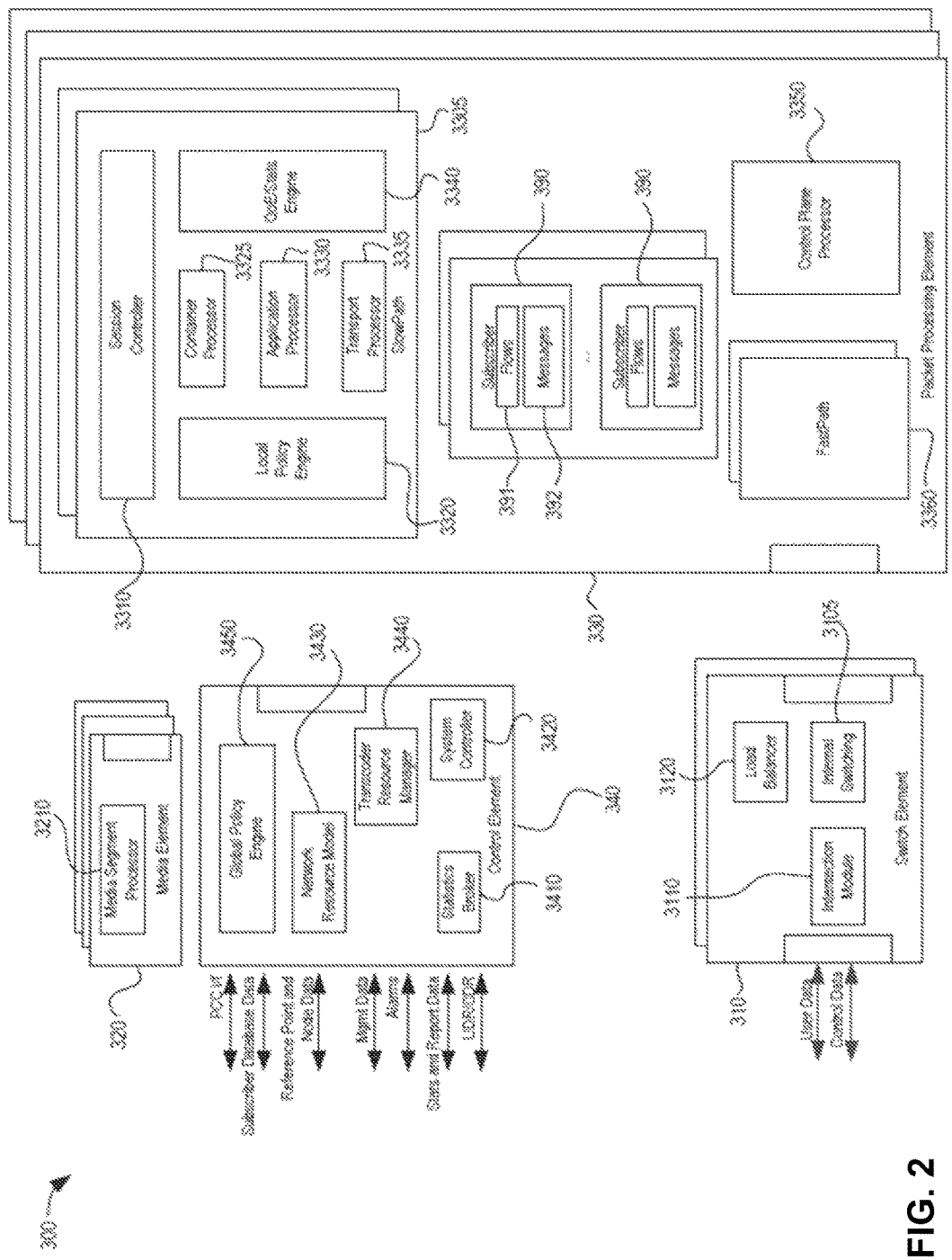
FIG. 2 is a simplified block diagram of a media service gateway in accordance with an example embodiment.

Referring now to FIG. 2, there is illustrated a simplified block diagram of a media service gateway 300, which is an example implementation of media service gateway 135 of FIG. 1.

Media service gateway 300 is generally capable of identifying media traffic in generic network data traffic. Identifying media permits media-centric policy execution and traffic management. This is a significant enhancement over conventional per-flow or per-subscriber application of policy, in which policies are applied to individual flows (per packet or per flow) or applied to all data for a particular subscriber (per subscriber). Media service gateway 335 may be configured to determine and enforce media-centric policies to balance the overall quality of experience (QoE) and network utilization for all users given widely varying quality levels from competing media applications, based on the service provider's policy constraints. Determinations and enforcement can be performed by working in a closed loop mode, using continuous real-time feedback to optimize and tune individual media sessions. In conjunction with detailed media session analysis and reporting, media service gateway 300 may provide control and transparency to service providers attempting to manage rapidly growing media traffic on their network.

To accomplish this, media service gateway 300 performs a number of functions that would conventionally be implemented via separate interconnected physical appliances. Implementation in an integrated architecture, which supports a wide range of processor options, is beneficial in order to reduce cost while improving performance and reliability. Accordingly, media service gateway 300 may comprise one or more switch elements 310 one or more media processing elements 320, one or more packet processing elements 330, and one or more control elements 340 in an integrated platform. In some embodiments, the function of one or more of switch elements 310, media processing elements 320, packet processing elements 330 and control elements 340 may be integrated, such that a subset of the elements implements the entire functionality of media service gateway 300 as described herein. In some embodiments, one or more of the elements may be implemented as a server "blade", which can be coupled together via a backplane. Each of the elements may comprise one or more processors and memories.

Switching and Input/Output Elements

Switching and input/output elements 310 can generally be considered to provide the external network interface for media service gateway 300. Each switching and input/output element 310 may comprise a processor (not shown) configured to perform control and data plane traffic load balancing across packet processing elements 330. Each switching and input/output element 310 may further comprise an internal switching module 3105 configured to perform internal control and data plane traffic switching between all elements, and one or more traffic intersection modules 3110, configured to provide most or even all external data input/output for the media service gateway 300. Media service gateway 300 can function with a single switching and input/output element 310, however multiple switching and input/output elements 310 may be preferred for redundancy.

Each switching and input/output element 310 may further comprise one or more load balancers 3120, which may be configured to distribute traffic from a large number of subscribers evenly across one or more packet processing elements 330. This distribution allows high bandwidth links to be processed without overloading any single packet processing element 330. Load balancer 330 may apply filter rules to identify a subset of data traffic (e.g., to the lowest octet of a subscriber's IP address—essentially a 256 bucket hash), which may then be mapped to a specific packet processing element 330. In some embodiments, load balancer 3120 may be configured to re-balance traffic, e.g. in the event of a packet processing blade 330 failure. This also permits load re-distribution, rolling upgrades, and other features which require the temporary transfer of traffic from one packet processor element 330 to another, such as the failure of a packet processing element.

Internal switching module 3105 may transmit and receive data traffic between elements in the media service gateway 300 or between multiple media service gateways.

Intersection module 3110 may enable media service gateway 300 to operate in one or more of a number of intersection modes. These intersection modes can permit passive monitoring of traffic, active management of traffic, or combinations thereof, for example using an appropriate virtual local area network (VLAN) configuration. Intersection module 3110 may operate as a transparent layer 2 network device.

For passive monitoring of traffic, intersection module 3110 may be configured to receive a duplicate packet stream, for example, from a network tap or span port, which is processed and later discarded. Intersection module 3110 may also intersect the packet stream, using a bump-in-the-wire configuration, and place the packets back on the wire unmodified, or make use of the integrated switching capabilities to duplicate the packet stream internally and forward copies of the packets for processing, while returning the originals to the wire immediately. This latter approach can be used to provide extremely low latency processing, which further permits easy transition of media service gateway 300 from passive monitoring to active traffic management.

For active management, intersection module 3110 may also be configured in a bump-in-the-wire configuration, to forward all packets to one or more packet processing elements 330 where management logic may be applied. In the case of active management, packets forwarded internally for further processing may be modified before being placed back on the wire.

Intersection module 3110 may provide input/output facilities for intersecting multiple data links within a network in a transparent, bump-in-the-wire configuration. A transparent bump-in-the-wire configuration is one wherein packets entering a device on a particular port (representing one side of a single data link) are forwarded to the correct 'partner' port (representing the other side of the same physical link) after they have been processed, transparently to other nodes or devices. In order to accomplish this, intersection module 3110 may mark packets when they are received by media service gateway 330 in order to identify the source data link, and the direction. Such internal marking can be reversed or deleted before the respective packets are re-enqueued on the wire. Packets may be internally marked in a number of ways, such as VLAN tags, reversible manipulation of source or destination or both MAC addresses, and adding encapsulation headers (using standard or proprietary protocols). The additional information encoded in the packet marking allows each packet to carry the information necessary to direct it to the correct output port without the need for large amounts of internal storage or complex, time-consuming lookups.

Media Processing Elements

Media processing elements 320 may be configured to perform inline, real-time, audio and video transcoding of selected media sessions. Media processing elements 320 may also be configured for an off-line, batch conversion workflow mode. Such an offline mode can be used to generate additional streams for a particular media content item at a variety of bit rates and resolutions as idle resources become available. This can be desirable where a particular media content item is frequently delivered in a variety of network conditions.

Media processing elements 320 may comprise one or more general purpose or specialized processors. Such specialized processors may be optimized for media processing, such as integrated media processors, digital signal processors, or graphics processing units.

Media segment processors 3210 operate on media processing elements 320 and may implement individual elementary stream transcoding on a per-segment basis. A segment can be defined as a collection of sequential media samples, which starts at a random access point. Media segment processor 3210 may exchange control and configuration messages and compressed media samples with one or more packet processing elements 330.

Media segment processor 3210 may generally perform bit rate reduction. In some cases, it may be beneficial for media segment processors 3210 to perform sampling rate reduction (e.g., spatial resolution and/or frame rate reduction for video, reducing sample frequency and/or number of channels for audio). In some other cases, it may be beneficial for media segment processors 3210 to perform format conversion for improved compression efficiency, whereby the output media stream being encoded may be converted to a different, more efficient format than that of the input media stream being decoded (e.g., H.264/AVC vs. MPEG-4 part 2).

In some cases, a plurality of media segment processors 3210 may operate concurrently in the same media element 320 to provide multi-stream transcoding. In some other cases, media segment processors 3210 for a single media session may be invoked across multiple hardware resources, for example to parallelize transcoding over multiple cores or chips, or to relocate processing in case of hardware failure. Parallelization may occur at the direction of a session controller 3310 running on packet processing elements 330.

In some cases, media streams may be modified to comprise alternative media stream content, such as inserted advertisements or busy notification.

Packet Processing Elements

Packet processing elements 330 may be generally configured to analyze the network traffic across all layers of the TCP/IP (or UDP/IP, or other equivalent) networking stack, identify media traffic, and apply policy. To facilitate processing with minimal latency and maximum throughput packet processing workloads may be divided into fast-path 3360 and slow-path 3305 modules, which provide separate threads of execution.

Packet processing can be both CPU intensive and highly variable. The amount of processing required for each packet varies depending on the complexity of the packet and the amount of processing required on the packet in order to implement a desired policy. Using a single thread of execution to process every packet can result in excessive latency for packets that require significant processing, and also fails to take advantage of parallelization.

In the described methods and systems, processing can be divided into two (or more) layers, where the base layer can be referred to as a fast-path and one or more additional processing layers can be referred to as a slow-path. The fast-path generally implements a first stage of packet processing which requires only a minimal amount of CPU performance. Packets that do not require advanced processing may be forwarded immediately at this stage and re-enqueued back to the wire with very low latency. Packets that require greater processing can be forwarded to a slow-path for deeper processing. Slow-path processing can be performed independently or in parallel with the fast-path processing, such that slow-path processing does not block or impede fast-path processing. Multiple slow-path threads can be provided, to take advantage of parallel processing, for example, when using multi-core processors.

Fast-Path Module

There may be one or more fast-path modules 3360 per packet processing element 330, each receiving load-balanced traffic, for example from a load balancer 3120. In some cases, a fast-path module 3360 may receive packets from a network interface and forward them to one or more slow-path modules 3305 for further processing. Accordingly, a fast-path module 3360 may distribute processing load evenly across one or more slow-path modules 3305. Fast-path module 3360 may implement a high-performance timer system in order to "time-out" or expire flows and media sessions. Fast-path module 3360 may implement mechanisms to send messages between packet processing modules on the element (e.g., between slow-path modules, fast-path modules, and the control-plane processor). Fast-path module 3360 may find and parse the IP layer (IPv4/IPv6) in each packet, perform IP defragmentation, and associate the packets with their appropriate layer-4 UDP or TCP flows. Processing of packets by fast-path module 3360 may also trigger flow and subscriber lookups or creation.

Fast-path module 3360 may support multiple flow states for each packet direction, such as forward, tee, vee, and drop.

In the forward state, packets are re-enqueued to the network interface for immediate transmission, without processing by slow-path module 3305.

In the tee state, packets are both re-enqueued to the network interface for immediate transmission and copied to a slow-path module 3305 for further processing.

In the vee (hold) state, packets are delivered to a slow-path module 3305 for further processing. After processing, slow-path module 3305 may return one or more packets to fast-path module 3360 to be re-enqueued to the network interface for transmission. Accordingly, in the "vee" or "inline" mode, packets may be considered as being processed "inline", that is forwarded in modified or unmodified form to the original destination. In some cases, while in the "inline" mode, the media service gateway may switch between a bridging and proxying action on a per flow (and therefore per-media session) basis.

In the drop state, packets are discarded without re-enqueuing to a network interface for transmission or further slow-path module 3305 processing.

Transitions between these states are governed by one or more policies and slow-path module 3305 processing.

Fast-path module 3360 may implement packet marking, governed by policy. Marking is performed to manage network traffic by assigning different traffic priorities to data. Packet marking may be subscriber-based, device-based, location-based or media session-based, for example, wherein all flows belonging to a particular location or to a particular media session may be marked identically. Marking may include a variety of class-of-service marking technologies, including IP Type of Service (TOS) values, IP Differentiated Services Code Point (DSCP) values, VLAN Priority Code Point (PCP) values, or Multiprotocol Label Switching (MPLS) traffic class values. With each of these technologies, the fast-path module 3360 may be configured to apply a specific Class of Service (COS) for specific subset of traffic.

Fast-path module 3360 may also implement shaping and/or policing, as governed by policy. Shaping and policing are tools to manage network traffic by dropping or queuing packets that would exceed a committed rate. Shaping and/or policing may be subscriber-based, device-based, location-based, or media session-based, for example, wherein all flows belonging to a particular location or to a particular device session may be policed and/or shaped identically. Shaping is typically applied on TCP data traffic, since TCP traffic endpoints (the client and server) will inherently back-off due to TCP flow control features and self-adjust to the committed rate. The fast-path module 3360 may be configured to apply a specific policer or shaper to a specific subset of traffic.

Control Plane Processor

For deployment in a mobile network, such as networks employing 3GPP GRPS/UMTS, LTE, or similar standards, it may be desirable to determine subscriber and device information, location, as well as other mobility and network load parameters for subscriber, device, and location-based traffic management and reporting purposes. This can be accomplished in part by inspecting control plane messages exchanged between gateways, for example GTP-C (GPRS Tunneling Protocol Control) over the Gn interface, GTPv2 over the S4/S11 or S5/S8 interfaces, and the like, or by receiving mobility information from other network nodes, such as the RNC, MME and the like.

In the case of the former, a control plane processor 3350 optionally running on packet processing elements 330 may receive control plane messages from the fast-path module 3360, parse relevant control-plane messages exchanged between gateways in order to extract and map subscribers and devices to locations, and redistribute this information within the media service gateway 330.

In some cases, the media service gateway 300 can function without control plane information, however device, subscriber, and location-aware features such as congestion estimation and aggregate policies may be negatively affected.

Slow-Path Module

As described above, fast-path module 3360 may schedule work across one or more slow-path modules 3305. To load-balance work between the slow-path modules 3305, the fast-path module 3360 may schedule work using a subscriber object or construct 390 in a memory of the packet processing element 330. A subscriber object 390 may identify and characterize all flows 391 and associated work/messages 392 for a given subscriber among a plurality of subscribers. A subscriber object 390 may be thought of as the basic unit of processing for slow-path modules 3305. All messages 392, including packets, to be processed for a given subscriber can be enqueued in the subscriber construct 390 and then scheduled and provided to a slow-path module 3305 based on a load-balancing algorithm designed to minimize latency and maximize throughput. Slow-path module 3305 then de-queues and executes pending messages on an input queue built of subscriber objects 390. Messages 392 typically comprise instructions for executing pending work for a given subscriber construct 390.

Fundamentally, a slow-path module 3305 sends and receives messages to/from a fast-path module 3360. Slow-path module 3305 parses the transport through application layer of received/sent packets, and executes policy on subscriber objects 390, which may include subscriber, device, location or media session analysis and processing, for example.

Slow-Path—Transport Layer Processor

Within the slow-path module 3305, transport layer processor 3335 may parse the transport layer (e.g., TCP, UDP, etc.) and keep track of when packets are sent and received, including when packets are acknowledged (or lost) by the client, to permit modeling of the client video buffer, for example as described in U.S. application Ser. No. 13/231, 497, entitled "Device with video buffer modeling and methods for use therewith", the entire contents of which are hereby incorporated by reference. Transport layer processors 3335 may also reconstruct the data for the application layer and invoke appropriate application layer processors (e.g., HTTP) by examining incoming data from both directions.

Transport layer processor 3335 may implement transparent intelligent proxy for TCP connections (e.g., to permit selective inline modification of packets) when a flow is in tee or vee state. In addition to the conventional benefits of proxying TCP connections between disparate network segments, being selectively inline decreases the risk of the proxy interacting in detrimental ways with non-standard applications and increases packet processing throughput.

Through transport layer processor 3335 intelligent TCP proxy, slow-path module 3305 may support passive and proxy flow states, and transitioning from passive to proxy state at any point during the lifetime of a flow.

Passive flow states imply that the active TCP proxy is disabled (i.e., incoming packets are forwarded without modification and new packets are not created) even though the payload may undergo further analysis through the rest of slow-path processing.

Proxy flow states imply that a TCP proxy is in effect, that is, that both sides of the proxy act as distinct, intermediate sockets. Generally, packets are consumed by one side of the proxy. The incoming payload may be dropped, modified or left unchanged as described herein. Outgoing payloads are those forwarded to the output side of the proxy, following slow-path module 3305 processing.

Slow-Path—Application Layer Processor

Application processor 3330 may be configured to operate on certain types of detected application layer content, such as HTTP, RTSP and RTMP. Once the application type has been identified, transport layer processors 3335 may largely delegate subsequent payload parsing to the application layer processors 3330. Application layer processors 3330 may be responsible for identifying and delegating to appropriate session controllers 3310 when media sessions are detected, and for relating flows, characteristic interactions and streams to particular sessions.

A media session may generally be considered to have been identified once sufficient traffic relating to that media session has been observed at the application layer. In most cases, the application layer protocols used for media streaming can generally be identified with the first few bytes of payload. After identifying the application payload, the payload can be parsed to find the media content, if any. This can be performed by dividing the communication into independent interactions, which may correspond to individual request/response pairs. Each interaction is evaluated to determine if the content is streaming media. If the interaction contains streaming media, it is further analyzed to extract media characteristics. Those interactions sharing common media characteristics may be encapsulated into streams. A media session may be a collection of one or more streams.

Slow-Path—Container Layer Processor

Container processor 3325 may parse, analyze and process media containers such as FLV, MP4, ASF and the like. In some variant embodiments, it may also parse, analyze and process associated metadata such as gzipped content, manifest files, and the like. A container processor 3325 can analyze media containers and associated metadata without producing output, for statistics collection or QoE calculation. A container processor 3325 can also produce a new media container, which may differ from the source container in its format or content, via de-multiplexing, transcoding, and re-multiplexing. A container processor 3325 can also produce new metadata. The decision of whether to analyze or produce a new container can be governed by policy.

Generally, media sessions should be identified relatively soon after the container processor 3325 starts parsing the input container. The amount of input that can be buffered in duration or size can be a limiting factor on how soon a decision is made and whether or not certain policies can be applied. A session identification timer may be used to enforce an upper bound on latency for session identification.

Slow-Path—Session Controller

Session controller 3310 generally encapsulates all of the state and processing for a media session. It may model, modify, and report on media traffic and media sessions. This includes concepts such as session relation, policy execution, and statistics measurement. In some cases, the session controller 3310 may support allowing a media session to be initially passed through unmodified, but later transcoded due to changes in policy, network conditions including sector load and/or congestion, or the measured QoE.

Slow-Path—Local Policy Engine

Local Policy Engines 3320 (LPE) can be deployed on every packet processor element 330 and act as a Local Policy Decision Point (L-PDP) as well as a Policy Enforcement Point (PEP). LPE 3320 sends policy requests to a Global Policy Engine (GPE) 3450 of control element 340 and receives and processes policy responses from the GPE 3450. LPE 3320 may also provide local policy decisions for session controller 3310 and fast-path module 3360 in order to reduce the messaging rate to the GPE 3450. LPE may perform a variety of media related enforcement actions.

Policy actions which may be supported on media traffic include access control (i.e., whether to allow the media session), re-multiplexing, request-response modification, client-aware buffer-shaping, transcoding, adaptive streaming control, inserting or replacing content in the media session, in addition to the more conventional per-flow actions such as marking, traffic policing/shaping, and the like. Media-centric policy actions may be further scoped, that is, applied only to attributes (sites, devices, subscribers, applications, locations, load levels, etc.), or constrained, that is, subject to minimum/maximum bit rates, frame rates, QoE targets, resolutions, and the like, as defined herein.

Slow-path module 3305 may implement access control, as governed by policy. For example, based on subscriber data plan or quota, or in situations where network resources are scarce, or in situations where the QoE for a new media session is expected to be poor, an access control policy may deny service to the new media session. In addition to denying a media session, providing some form of notification to the subscriber such as busy notification content may reduce the negative impact of the policy on the subscriber's satisfaction.

Slow-path module 3305 may implement re-multiplexing, as governed by policy. A re-multiplexing policy can convert a media session from one container format to another. This action may be useful to allow for the future possibility of transcoding the media session or to convert the media format to better align with client device capabilities.

Slow-path module 3305 may implement request-response modification, as governed by policy. Request-response modification may involve modifying either the client request or the response. For example, request-response modification may replace requests for high definition content with similar requests for standard definition content.

Slow-path module 3305 may implement client-aware buffer shaping, as governed by policy. Client-aware buffer shaping may use a client buffer model to prioritize computing and network resources within media service gateway 300, to ensure smoothest playback for the most possible client devices. For example, if client A has 10 seconds of content in a playback buffer, client B has 60 seconds of content in a playback buffer, and client C has 2 seconds of content in a playback buffer, client-aware buffer shaper may prioritize transmission for client C ahead of transmission for clients A and B, and further prioritize client A ahead of client B.

Slow-path module 3305 may implement transcoding, as governed by policy. When a transcode policy action is selected for the session, the session controller 3310 may perform dynamic control of a transcoder to conform to policy targets and constraints. In some cases, it may further implement a feedback control mechanism for a video transcoder to ensure that the media session achieves targets and constraints set out in the policy engine, such as a transcoded video bit rate, transcoded video QoE, etc. The controller reevaluates its control decisions periodically or when it receives a policy update.

Slow-path module 3305 may also implement adaptive streaming control, as governed by policy. Adaptive stream control may employ a number of tools including request-response modification, manifest editing, shaping or policing, and transcoding. For adaptive streaming, request-response modification may replace client segment requests for high definition content with similar requests for standard definition content. Manifest editing may modify the media stream manifest files in response to a client request. Manifest editing may modify or reduce the available operating points in order to control the operating points that are available to the client. Accordingly, the client may make further requests based on the altered manifest. Shaping or policing may be applied to adaptive streaming to limit the media session bandwidth, thereby forcing the client to remain at or below a certain operating point.

Slow-Path—QoE and Stats

The QoE and statistics engine 3340 may generate statistics and QoE measurements for media traffic and media sessions, may provide estimates of bandwidth required to serve a client request and media stream at a given QoE, and may make these values available as necessary within the system. Examples of statistics that may be generated include, e.g. the media-specific and non-media-specific attributes described previously. QoE measurements may include, e.g. delivery QoE, presentation QoE and combined QoE.

The raw inputs used for statistics and QoE measurements can be extracted from the traffic processors at various levels, including the transport, application, and media container levels, and the control plane processor. For example, in the case of a progressive download over HTTP, the container processor detects the locations of the boundaries between video frames and, in conjunction with the transport processor, determines when entire media frames have been acknowledged by the subscriber device to have arrived. The application processor provides information on which client device is being used, and playback events, such as the start of playback, seeking, and the like.

A primary component of delivery QoE measurement is a player buffer model, which estimates the amount of data in the client's playback buffer at any point in time in the media session. It uses these estimates to model location duration and frequency of stall events.

Control Element

Control element 340 may generally perform system management and (centralized) application functions. System management functions may include configuration and command line interfacing, Simple Network Monitoring Protocol (SNMP) alarms and traps and middleware services to support software upgrades, file system management, and system management functions. Control element 340 generally comprises a processor and memory configured to perform centralized application functions. More particularly, control element 340 comprises a global policy engine 3450, a network resource model module 3430 (NRM), a transcoder resource manager 3440 (XRM), and statistics broker 3410.

Centralization of this processing at control element 340 can be advantageous as, due to load balancing, no single packet processing element 330 generally has a complete view of all sessions within a given location, nor a view of all locations.

Global Policy Engine

The media service gateway 300 policy system consists of two main logical entities, a global policy engine 3450 of the control element 340 and a local policy engine 3320 of each slow-path module 3305.

GPE 3450 may act as a Policy Decision Point (PDP) and include a messaging framework to communicate with the LPE 3320, NRM 3430 and XRM 3440. The GPE 3450 may maintain a set of locally configured node-level policies, and other configuration settings, that are evaluated by a rules engine in order to perform active management of subscribers, devices, network, and media traffic. Media traffic may be subject to global constraints and affected by dynamic policies triggered during session lifetime. Accordingly, GPE 3450 may keep track of live media session metrics and network traffic measurements by communicating with the NRM 3430. GPE 3450 may use this information to make policy decisions both when each new media session starts and throughout the lifetime of the media sessions, as the GPE may adjust polices in the middle of a media session due to changes, e.g. in either or slow-changing or fast-changing attributes.

The policies available at media service gateway 300 may be dynamically changed by, for example, a network operator. In some cases, GPE 3450 may access policies located elsewhere on a network. For example, GPE 3450 may gather media-centric policies based on the 3rd Generation Partnership Project (3GPP) Policy Control and Charging (PCC) architecture ecosystem (e.g., with a Policy and Charging Rules Function (PCRF)). In such embodiments, media service gateway 300 via GPE 3450 may enforce policy (i.e., carry out a Policy Control Enforcement Function (PCEF) with Application Function (AF), or Application Detection and Control (ADC)).

GPE 3450 may be configured through a set of external policies that allow the media service gateway to differentiate between how non-media and media traffic is handled, to admit, reject, or limit the amount of resources used by individual media sessions according to their intrinsic characteristics, to regulate the number of media sessions and control the amount of bandwidth used at the location-level (e.g., site), to regulate the number of media sessions and control the amount of bandwidth used at the network level, to progressively apply more aggressive management as bandwidth usage and/or congestion level increases for a particular location, to establish quality of experience goals and preferences to guide or constrain the video optimization process when making individual media session decisions, etc.

Non-media-centric policies are generally packet-based or flow-based and can be scoped by e.g. subscriber, device, and network attributes. The actions are generally implemented in the fast-path module 3360, although configuration and control of the action may occur in slow-path module 3305. Actions may include permit, mark, shape, police, and drop, and may be applied to individual flows or aggregates of flows.

The permit action is the default, passive action, which simply re-enqueues packets to the wire. The mark action applies specific TOS (precedence) or DSCP (AF class) markings to matching flows. The shape action queues packets above a committed per-flow rate. The police action drops packets above a committed per-flow rate. The drop action is a continuous action, to drop all packets that follow, from matching flows, and may be initiated mid-flow.

Media-centric actions comprise access control, transcoding, re-multiplexing, request-response modification, client-aware buffer-shaping, adaptive streaming control, inserting or replacing content in the media session, in addition to the more conventional per-flow actions such as marking, traffic policing/shaping, and the like, as described herein. Media-centric policy actions may be further scoped, that is, applied only to specific media applications, devices, resolutions, locations, time-of-day, or constrained, that is, subject to minimum/maximum bit rate, frame rate, QoE targets, resolution, and the like Dynamic policy triggers, or simply dynamic triggers can be generated for all or some fast-changing attributes, such as bandwidth usage, QoE measurements, transcoding efficiency measurements, location, and network congestion status that need to be monitored or computed and made available in real-time for the timeliness of policy decisions. Media service gateway 300 may implement some of these functions through, e.g. QoE and statistics engine 3440, Network Resource Model 3430 (NRM), etc.

The NRM 3430 may implement a hierarchical subscriber and network model and load detection system that receives location and bandwidth information from packet processor elements 330 or from external network nodes, such as RAN probes, to generate and update a real-time model of the state of a mobile data network 160, in particular congested domain, e.g. sectors. The network model may be based on data from at least one network domain, where the data may be collected by feed aggregation server 140 using one or more node feeds or references points. The NRM may implement a location-level congestion detection algorithm using measurement data, including location, RTT, throughput, packet loss rates, windows sizes, and the like from packet processor elements 330. The NRM 3430 may then provide the GPE 3450 with the currently modeled cell load for one or more cells.

NRM 3430 may also receive per-session statistics such as session bandwidth utilization and quality metrics from packet processor elements 330 for ongoing session tuning and aggregate limit control. It may also receive updates from a control plane processor 3350 to enable mapping subscribers and associated traffic and media sessions to locations.

The XRM 3440 may cooperate with GPE 3440 to allocate media segment processors 3210 from the pool of media processors available in the system, and to identify the available transcoding capabilities to other elements of media gateway system 300, in terms of supported configurations and expected bitrate and quality levels. Resource allocation function may fulfill requests from the GPE 3450 for transcoding resources and manage the status of the media processors. It may determine free media processors when a session is complete, receive updates on the state of the media processors and make determinations about turning on or off processors.

XRM 3440 maintains information about the media processing capabilities of the media processors, and available software versions, and can be configured to advertise these capabilities to other elements of media gateway system 300. It may have a role in deciding appropriate transcoding configurations, both initially and dynamically throughout a session. XRM 3440 may also be able to move a transcode session from one resource to another, for example if a less loaded resource becomes available. As such, media resources may be allocated by the XRM 3440 on a segment basis, rather than for an entire elementary stream.

System controller 3420 may be configured to perform system management functions including configuration and operational control via command line interface (CLI), generation and transmission of SNMP alarms and traps, implementation of middleware services to support software upgrades, file system management, and other system management functions.

Statistics broker 3410 may be configured to generate and output statistics and report data, such as call data records (CDR) or user data records (UDR) regarding the operation of media service gateway 300 to a remote device. Reported data may include data such as transcoding resolutions, bitrates, etc. Additional reported data may include data used by an analytics engine as described in co-pending U.S. patent application Ser. No. 13/191,629, the entire contents of which are hereby incorporated by reference.

Figure 3:
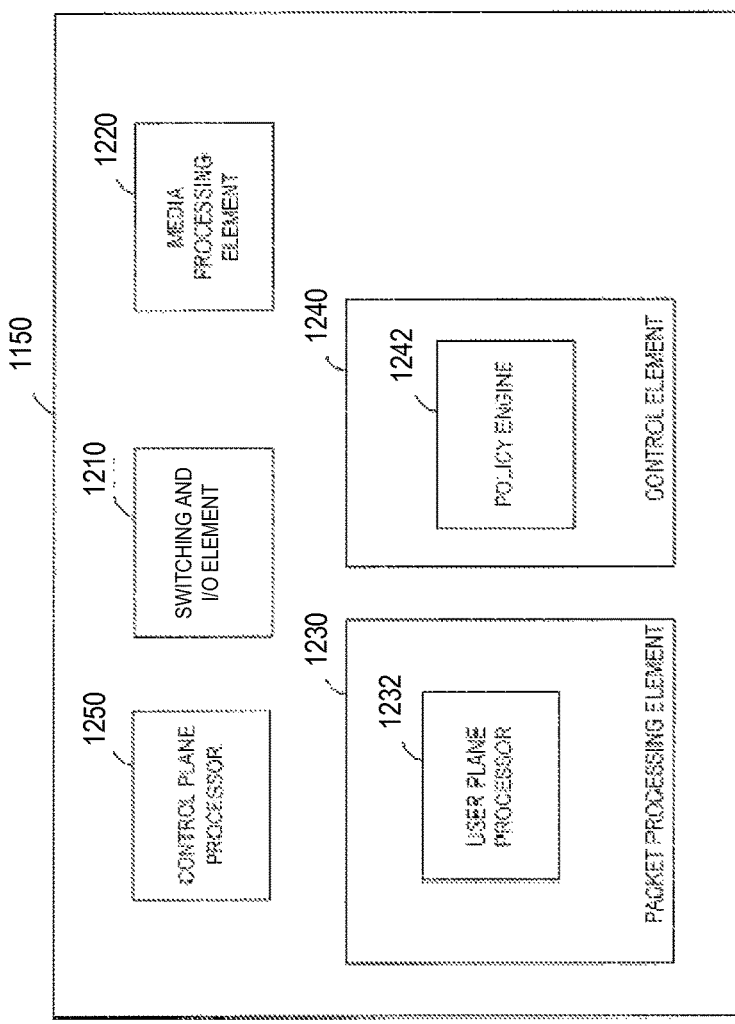
FIG. 3 is a simplified block diagram a media service gateway in accordance with an example embodiment.

Referring now to FIG. 3, there is illustrated another simplified block diagram of a media service gateway 135 of FIG. 1 according to one example embodiment. Media service gateway 135 is generally configured to route any generic network data traffic for client devices, such as client device 1120, to and from a network, such as network 1110 and the Internet. However, media service gateway 135 can be further configured to identify media traffic in generic network data traffic, and to permit media-centric policy execution and traffic management of in-progress communication sessions ("flows"). This is a significant enhancement over conventional per-flow or per-subscriber application of policies, in which policies are applied to individual flows (on a per packet or per flow basis) or applied to all data for a particular subscriber (per subscriber). Media service gateway 135 may be configured to determine and enforce media-centric policies to balance the overall quality of experience (QoE) and network utilization for all users, based on the service provider's policy rules. Determinations and enforcement can be performed by working in a closed-loop mode, using continuous real-time feedback to optimize and tune individual and aggregate media sessions. In conjunction with detailed media session analysis and reporting, media session control system 150 may provide control and transparency to service providers attempting to manage rapidly growing media traffic on their network.

To accomplish this, media service gateway 135 may perform a number of functions that would conventionally be implemented via separate interconnected physical appliances. Implementation in an integrated architecture, which supports a wide range of processor options, is beneficial in order to reduce cost while improving performance and reliability. Accordingly, media service gateway 135 may have one or more switching and input/output elements 1210, one or more media processing elements 1220, one or more packet processing elements 1230, one or more control elements 1240, and one or more control plane processors 1250, in an integrated platform. In some embodiments, the function of one or more of switching and input/output elements 210, media processing elements 1220, packet processing elements 1230, control elements 1240, and control plane processors 1250 may be integrated, such that a subset of the elements implements the entire functionality of media service gateway 135 as described herein. In some embodiments, one or more of the elements may be implemented as a server "blade", which can be coupled together via a backplane. Each of the elements may comprise one or more processors and memories.

Switching and input/output elements 1210 may be configured to perform control and user plane traffic load balancing across packet processing elements. Each switching and input/output element 1210 may comprise one or more load balancers configured to distribute traffic from a large number of subscribers evenly across one or more packet processing elements 1230. The traffic may be re-balanced between one or more packet processing elements 1230 in the event of a packet processing element 1230 failure.

Switching and input/output elements 1210 may be configured to operate the media service gateway 135 in one or more of a number of intersection modes. The intersection modes may permit passive monitoring of traffic, active management of traffic, or a combination thereof, for example by using an appropriate virtual local area network (VLAN) configuration. Switching and input/output element 1210 may be configured to allow packets that do not relate to media traffic to be forwarded without further processing, resulting in minimal added latency, while permitting packets that may relate to media traffic to be subjected to further processing.

Media processing elements 1220 may be configured to perform inline, real-time, audio and video transcoding of selected media sessions. Media processing elements 1220 may comprise one or more general purpose or specialized processors. Such specialized processors may be optimized for media processing, such as integrated media processors, digital signal processors, or graphics processing units. Such processors operate on media processing elements 1220 and may implement individual elementary stream transcoding on a per-segment basis. A segment can be defined as a collection of sequential media samples, which starts at a selected or random access point. The processors may exchange control and configuration messages and compressed media samples with one or more packet processing elements 1230.

Media processing elements 1220 may generally perform bit rate reduction. In some cases, media processing elements 1220 may perform sampling rate reduction (e.g., spatial resolution and/or frame rate reduction for video, reducing sample frequency and/or number of channels for audio). In some other cases, media processing elements 1220 may perform format conversion for improved compression efficiency, whereby the output media stream being encoded may be converted to a different, more efficient format than that of the input media stream being decoded (e.g., H.264/AVC vs. MPEG-4 part 2).

Control element 1240 may generally perform system management and (centralized) application functions. System management functions may include configuration and command line interfacing, Simple Network Monitoring Protocol (SNMP) alarms and traps and middleware services to support software upgrades, file system management, and system management functions. Control element 1240 may generally comprise a processor and memory configured to perform centralized application functions. Centralization of processing at control element 240 may be advantageous as, due to load balancing, no single packet processing element 230 generally has a complete view of all sessions within a given network device, nor a view of all network devices.

Control element 1240 may include a policy engine 1242 that acts as a PDP such as global policy engine 3450 of FIG. 2. The policy engine 1242 may maintain and evaluate a set of policies, including media-centric policies, and other configuration settings in order to perform active control and management of media traffic. In operation, policy engine 1242 may dynamically evaluate and re-evaluate one or more policies for each media session under management by media service gateway 135.

The policies available at the media service gateway 135 may be dynamically changed by, for example, a network operator. In some cases, the policy engine 1242 of the control element 1240 may access policies located elsewhere on a network. For example, the policy engine 1242 may gather media-centric policies based on the 3rd Generation Partnership Project (3GPP) Policy Control and Charging (PCC) architecture ecosystem (e.g., with a Policy Charging and Rules Function (PCRF)). In such embodiments, the media service gateway 135 may enforce policy (i.e., carry out a Policy Control Enforcement Function (PCEF) with Application Function (AF), or Application Detection and Control (ADC)).

Packet processing elements 1230 may be generally configured to analyze user plane traffic across all layers of the TCP/IP (or UDP/IP, or other equivalent) networking stack and identify media traffic via user plane processor 1232. The packet processing elements 1230 may be configured to immediately re-enqueue packets that do not require advanced processing "back to the wire" with very low latency. Packets that require additional processing can be forwarded internally for deeper processing.

Deeper processing may include parsing of the transport, application and container layers of received/sent user plane packets, and execution of policy based on media-specific or non-media-specific attributes, or media session analysis and processing, for example. The packet processing elements 1230 may forward general data traffic information and attributes, e.g. bit rates, TCP throughput, RTT, etc., to other elements. In some cases, some status characteristics may be inserted "in band" into user plane data, for example via HTTP enrichment. In these cases, packet processing elements 1230 can be configured to receive and parse control plane messages inserted by nodes in the radio access network.

In some cases, control plane processor 1250 may be configured to process control plane messages to extract subscriber identity or mobile device identity information, and to map the mobile devices (e.g., physical or geographic location). Control plane processor 1250 may forward the identity and location information to other elements. For example, in mobile networks using 3GPP GRPS/UMTS, LTE, or similar standards, subscriber and mobile device identity information, location, as well as other mobility and network load parameters may be gathered for subscriber, device, and location-based traffic management and reporting purposes. This can be accomplished in part by inspecting control plane messages exchanged between gateways, for example GTP-C (GPRS Tunneling Protocol Control) over the Gn interface, GTPv2 over the S4/S11 or S5/S8 interfaces, and the like, or by receiving mobility information from other network nodes, such as the RNC, Mobile Management Entity (MME) and the like. In some cases, some status characteristics may be inserted "in band" in control plane data, for example via GTP enrichment. In these cases, control plane processor 1250 can be configured to receive and parse control plane messages inserted by nodes in the radio access network.

A media session may generally be considered to have been identified once sufficient traffic relating to that media session has been observed at the application layer. In most cases, the application layer protocols used for media streaming can generally be identified by analyzing the first few bytes of payload data. After identifying the application payload, the payload can be parsed to find the media content, if any. This can be performed by dividing the communication into independent interactions, which may correspond to individual request/response pairs. Each interaction is evaluated to determine if the content is streaming media. If the interaction contains streaming media, it is further analyzed to extract media characteristics. Those interactions sharing common media characteristics may be encapsulated into streams. A media session may comprise a collection of one or more streams. Further information is presented in the pending application entitled, METHOD AND APPARATUS FOR MEDIA SESSION IDENTIFICATION, TRACKING, AND ANALYSIS, having application Ser. No. 14/029,363, filed on Sep. 17, 2013.

Figure 4:
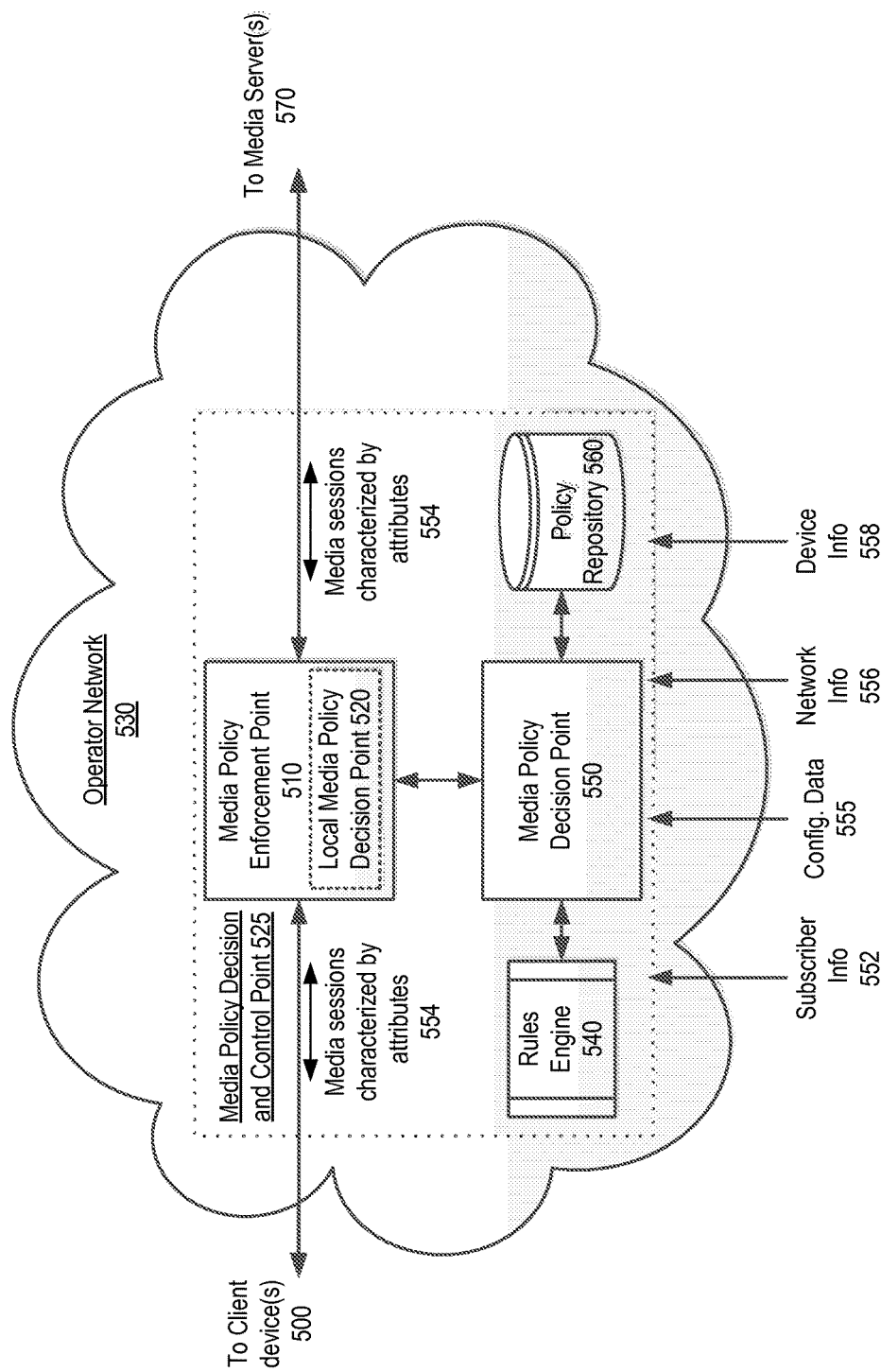
FIG. 4 is a block diagram of a media policy decision and control point in accordance with an example embodiment.

FIG. 4 is a block diagram of a media policy decision and control point in accordance with an example embodiment. In particular, a media policy decision and control point is presented that can be implemented via media service gateway 135 or 300 or via another gateway, server or other network device.

In the embodiment shown, a media policy decision and control point 525 is presented for use in a network, such as operator network 530, that provides streaming media in a plurality of media sessions between a media source, such as media server 570 and a corresponding plurality of client devices, such as client devices 500. The media policy control and decision point 525 includes a media policy enforcement point 510 having a local media policy decision point 520 and otherwise being coupled to a remote media policy and decision point 550. The media policy decision point 550 is coupled to a policy repository 560 that stores a plurality of media-centric policies and a rules engine 540 for evaluating policy rules.

The M-PEP 510 is generally configured to forward data packets associated with the data sessions of each client device 500 to and from the operator network 530, preferably with minimal latency. In some cases, the M-PEP 510 may modify the data sessions, particularly in the case of media sessions (e.g., streaming video or audio). The LPDP 520 can be deployed with the M-PEP 510 to provide local policy decisions for the media policy decision and control point 525 in order to reduce the messaging rate to the M-PDP 550. All these functions may run on distributed processing nodes and includes messaging frameworks to send, receive and dispatch policy protocol messages between the M-PEP 510 and LPDP 520, M-PEP 510 and M-PDP 550, and MPDP 550 and LPDP 510, as well as APIs for local communication.

While the policy repository 560 and rules engine 540 are shown separately from the media policy decision point 550, the functions ascribed to each may be implemented in the media policy decision point 550. The media policy enforcement point 510 and local media policy decision point 520 may be implemented via a single processing device or a plurality of processing devices. Further the media policy decision point 550 and rules engine 540 may be implemented via a single processing device or a plurality of processing devices with the policy repository 560 being implemented via an associated memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions described herein.

In operation, the media policy decision and control point 525 receives media and non-media specific attributes from operator network 530 such as subscriber attributes 552, media-specific attributes 554, network attributes 556 and device attributes 558. While the local media policy decision point 520 and media policy decision point 550 are shown as two separate entities, a single device or other devices can be implemented to perform the same of similar functions in conjunction with the media policy decision and control point 525. Further the allocation of functionality between these devices can vary based the particular network configuration and on the implementation of each device, with the overall functionality being performed cooperatively by the set of devices employed.

The media policy decision point 550/520 is configured to:
receive media traffic corresponding to one of the plurality of media sessions;
determine a plurality of media-specific attributes, based on the media session data; and
determine a plurality of non-media specific attributes; and
evaluate a plurality of media-centric policies to determine a proper subset of the plurality of media-centric policies that apply to the one of the plurality of media sessions.

The media policy enforcement point 510 is configured to enforce the proper subset of the plurality of media-centric policies to control the one of the plurality of media sessions, based on the attributes.

In an embodiment, the media policy decision point 550/520 is further configured to monitor the media session data to determine a change in at least one of the attributes during a media session. The media policy enforcement point 510 controls the media session based on the changes in the attributes. The plurality of attributes can include a plurality of session-static or otherwise slow changing attributes and a plurality of session-dynamic or otherwise fast-changing attributes.

Determining the change in attributes can include determining when one or more session-static attributes have changed during a media session. When a session-static attribute has changed during a media session, the media policy decision point 550/520 is further configured to re-evaluate the plurality of media-centric policies to determine a new proper subset of the plurality of media-centric policies that apply to that media session. The media policy enforcement point 510 controls the media session, based on the changes in the attributes, by enforcing the new proper subset of the plurality of media-centric policies. When the session-static attributes have not changed, but at least one of the plurality of session-dynamic attributes have changed during a media session, the media policy enforcement point 510 controls the media session based on the changes in the at least one of the attributes by:
evaluating an impact of the change in the at least one of the session-dynamic attributes on the proper subset of the plurality of media-centric policies; and
enforcing the proper subset of the plurality of media-centric policies based on the impact.

In an embodiment, the plurality of media-centric policies each include: a rule that includes a logical expression that defines when the rule is satisfied; and an action, associated with the rule. The media policy enforcement point 510, enforces each of the proper subset of the plurality of policies by: evaluating the logical expression to determine when the rule is satisfied; and performing the action associated with the rule when the rule is satisfied.

In a mode of operation, the plurality of media-centric policies further includes a priority associated with the rule. The media policy enforcement point 510, enforces each of the proper subset of the plurality of policies by: evaluating the logical expression to determine when the rule is satisfied; and also by performing the action associated with the rule when the rule is satisfied, based on the priority associated with the rule.

In an embodiment, the policy repository 560 is configured to store a plurality of media-centric policies. The media policy decision point 550/520 is configured to execute operational instructions in accordance with a media-centric policy language to select at least one of the plurality of policies corresponding to one of the plurality of media sessions. Similarly, the media policy enforcement point 510 can be configured to execute operational instructions in accordance with the media-centric policy language to control at least one of the plurality of media sessions based on selected ones of the plurality of media-centric policies. The media-centric policy language is a rule-based language that operates based on a plurality of attributes, wherein each attribute has a corresponding plurality of attribute values.

The plurality of attributes can include a media-specific attributes and non-media-specific attributes described previously, and corresponding attribute values.

The multimedia policy engine (MPE) herein may be viewed as an integrated and media-centric media policy decision point 550/520 and media policy enforcement point 510, as defined in International Engineer Taskforce (IETF) RFC 2753, and its design incorporates the high level policy concepts as described in IETF RFC 3060 and RFC 3460. Co-location of these functions in an MPE is not required but beneficially reduces signaling rates and latency, allows for single detection and tracking of media sessions, and permits a provides the foundation to manage individual media sessions and hence control media traffic behavior via a real-time control system.

The exemplary implementation may be described using the policy management concepts as defined in IETF RFC 3060, the Policy Core Information Model (PCIM), and IETF RFC 3460, PCIM Extensions, of the Policy Framework Working Group. This seminal work defined the basic policy structure that supported extensibility with a focus on network quality of service. The work has been adopted modified and enhanced by several organizations and forums over the years, but the original concepts of modeling a system and applying rules with the capability of creating groups of rules and evaluating them with defined logical operations remains intact.

The MPE extends PCIM policy models to support media-centric policy conditions, actions, rules, and groups. This is a necessary step as existing policy servers and enforcement points do not currently support the required semantics for expressing media-centric policy constructs. Modern interpretations of these entities, as adopted by 3GPP Policy Configuration and Charging Architecture (PCC), are the Policy Charging Rule Function (PCRF) and Policy Charging Enforcement Function (PCEF), which are not capable of media-centric policy decisions or enforcement.

Media policy decision and control point 525 can be connected to operator network 530 that can include one or more access and/or core networks for a client device 500 or other user equipment (UEs), which may be personal computers, mobile computing devices such as smartphones, set-top boxes, tablets or other media devices, etc. An access network may include radio access networks (RANs) and backhaul networks, in the case of a wireless data network. The client devices 500 generally communicate with one or more media servers 570 accessible via the operator network 530. It will be appreciated that servers may not be directly connected to the operator network 530, but may be connected via intermediate networks, service providers or other networks. In some cases, media servers 570 may be edge nodes of a content delivery network (CDN).

When implemented in a distributed fashion, the media policy decision point (M-PDP) 550, media policy enforcement point (M-PEP) 510 and local media policy decision point (LPDP) 520 may be coupled to a private or public network and communicate via an Internet Protocol (IP) and/or other communication format. The MPE (specifically M-PDP 550) uses one or more of the policies in the policy repository 560 to regulate the delivery of media between a media server 570 and a client 500. The same media-centric policy or policies may also apply to one or more media sessions.

In order to evaluate a media-centric policy, the M-PDP 550 (or an external entity) must first identify media traffic within the network traffic. The same is true for enforcing a media-centric policy, i.e. the M-PEP 510 (or an external entity) must identify media traffic within the network traffic. In the integrated MPE (PDP+PEP) media identification can be done once, by the media policy decision and control point 525.

Due to the long-lived nature of traffic flows related to media sessions (compared to e.g. a web page load), the policies to be applied may change during the lifetime of the media session. Therefore, it is beneficial if the media policy decision and control point 525 can evaluate policies not only at the beginning of a media session but also through its entire lifetime whenever the policy configuration included in configuration data 555, some of the session's underlying static attributes, or some session-dynamic attributes change. To facilitate this, the media policy decision and control point 525 may distinguish between attributes which tend to be session-static (or slow-changing) versus those that tend to be more dynamic (or fast-changing).

Moreover, in some network environments, there may be a large number of media-centric policies to be evaluated. To provide flexible and responsive network control, it may be necessary to evaluate media-centric policies for a media session on a frequent basis, for example once every two seconds. In a busy network device that manages a large number of concurrent media sessions, this level of frequent evaluation of policies may impose a burden on processing resources.

Therefore the M-PDP 550 may initially evaluate a general set of media-centric policies. A subset of the policies may be identified by selecting only those policies whose rules are currently satisfied, or whose rules are not presently satisfied but which may be satisfied at some point during the expected media session lifetime. Policies whose rules are not initially satisfied and are not expected to be satisfied within the life of the media session can be excluded from the subset of policies. Thereafter, only the subset of selected policies (a working set) need be re-evaluated during the media session in question, and these may be handled in a distributed manner by a LPDP 520 nearer or co-located with the M-PEP 510.

To facilitate the selection of a (smaller) working set of policies and the dynamic re-evaluation of a working set, it is helpful to categorize media session attributes as slow-changing (session-static) or fast-changing (session-dynamic). Slow-changing attributes may include subscriber identity, subscriber plan or quota, time of day, device identity, device type and capabilities, display size, display resolution, service type, server address, clip or content duration, streaming protocol, media container, audio codec, video codec, etc. That is, a slow-changing attribute is one that may be static or is expected to change infrequently, or not at all, during the lifetime of a media session As previously discussed, one slow-changing attribute may be a device capability, such as the ability to decode media content in a selected format (e.g., H.264, H.265, etc.). The ability of a particular device to decode a specific format is generally fairly static, and this is unlikely to change during the lifetime of a media session. That is, a mobile device that is capable of decoding H.264 but not H.265 is not likely to gain the ability to decode H.265 content during the lifetime of a media session.

Session-dynamic or fast-changing attributes are those that may change every few seconds, or sub-seconds, and may include subscriber location, location utilization load level, current audio or video bit rate adaptive streaming operating point, current quality level, time of day, and the like. Accordingly, a fast-changing attribute is one that may change during the lifetime of a media session. Accordingly, the M-PDP 550 (and/or LPDP 520) may need to keep track of (or be informed about) live media session metrics and subscriber and network-related measurements.

In an embodiment, the media policy decision and control point 525 includes the ability to distinguish between evaluating and selecting policies. Evaluating generally involves determining the result of a logical expression at a given point in time. Selecting generally involves retaining those policies that currently evaluate as "TRUE", or which may conceivably evaluate as "TRUE" within the lifetime of a media session, and discarding those policies that will always evaluate as "FALSE" within the lifetime of the media session. Therefore "selecting" can imply "evaluating".

"Selecting" further implies that substantially all policies within the general set are initially examined and those which initially do or eventually might evaluate to "TRUE" are placed within an entity which may be referred to the working set or a proper subset of all possible policies that is less than all possible policies in the general set. In the presence of dynamic conditions, only policies in the working set need to be re-evaluated when an underlying condition changes.

M-PDP 550 may utilize non-media-specific attributes such as device attributes 558 relating to the identified client device 500, which can be used to determine device capabilities (e.g., screen resolution, codec support, etc.). A device database that provides the device information 558 may comprise a database such as Wireless Universal Resource File (WURFL) or User Agent Profile (UAProf).

The M-PDP 550 may utilize may utilize non-media-specific attributes such as subscriber attributes 552. In some cases, subscriber information 552 may be based on subscriber database data obtained from external sources. A subscriber database data may include quotas and policies specific to the user and/or a subscription tier. The subscriber database may be accessed via protocols such as Diameter, Lightweight Directory Access Protocol (LDAP), web services or other proprietary protocols. Subscriber database data may be enhanced with subscriber information 552 available to the media policy decision and control point 525, such as a usage pattern associated with the subscriber, types of multimedia contents requested by the subscriber in the past, etc.

M-PDP 550 may also utilize non-media-specific attributes such as network attributes 556 including location, load, mobility etc.

Figure 5:
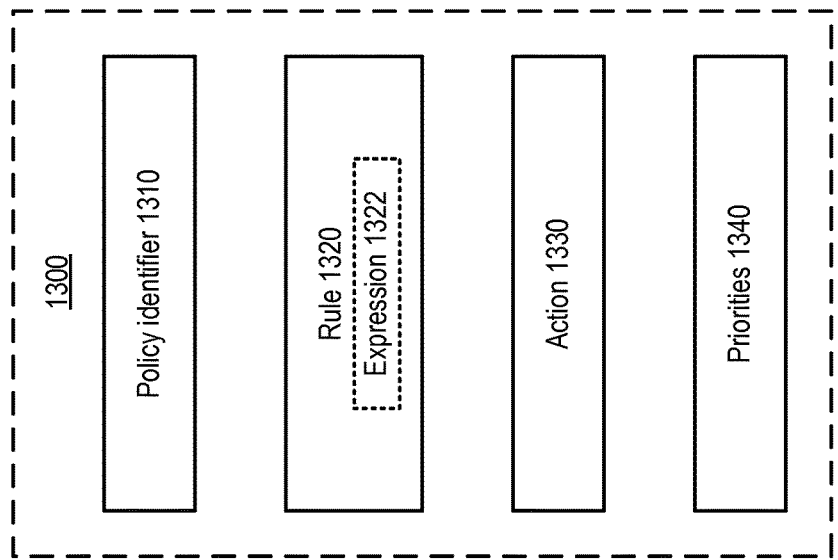
FIG. 5 is a block diagram illustrating the structure of an example policy.

Referring now to FIG. 5, there is illustrated the structure of an example policy 1300. Generally, each policy 1300 includes at least one rule 1320 and at least one action 1330 to be carried out when the rule 1320 is satisfied. Optionally, policy 1300 may include other elements, such as policy identifier 1310 (e.g., a unique name or identifier) and one or more priorities 1340.

Each rule 1320 has at least one logical expression 1322, which sets out the scope or constraints of the rule 320 and policy 1300. A logical expression traditionally yields a Boolean result (e.g., "TRUE" or "FALSE") and may be composed of one or more relational expressions connected by logical operators (AND, OR, NOT) that compare slow- or fast-changing media session attributes. A relational expression that includes a fast-changing media session attribute may be referred to as a dynamic trigger. For example, a logical expression 1322 may take the form of:

(VideoCodec=H.264) AND (QoE>MinimumQuality)

In this example, there are two relational expressions, one based on a slow-changing attribute, "VideoCodec" (i.e., "VideoCodec=H.264"), and one based on a fast-changing attribute, "QoE" (i.e., "QoE>MinimumQuality"). The "QoE>MinimumQuality" relational expression may also be referred to as a dynamic trigger. In some cases, variables may be hard-coded (e.g., 1000 kbps), or they may be constants or variables defined elsewhere, and in some embodiments constants or variables may themselves be considered to be slow-changing attributes. The logical expression may evaluate as "TRUE" or "FALSE" depending on the specific values of VideoCodec, QoE and Minimum Quality.

As described herein, fast-changing attributes may include quality levels, which may be compared against pre-defined target quality levels. The target quality level may be based on a quality metric, such as, a numerical value on a MOS scale. The target quality level may alternatively be a QoE range, i.e., a range of values with a minimum level and a maximum level. A policy engine may specify a wide variety of quality metrics and associated target quality levels. In some cases, the quality metric may be based on an acceptable encoding and display quality (e.g., Presentation QoE). In some other cases, the quality metric may be based on an acceptable network transmission and stalling impact on quality (e.g., Delivery QoE). In some further cases, the quality metric may be based on a combination of acceptable encoding and display quality as well as network transmission and associated stalling impact on quality, or a combined QoE score.

It will be appreciated that a virtually unlimited variety of media-centric policy rules can be created by crafting logic expressions using the attributes described herein and other variables and constants.

When a rule 1320 is evaluated and returns a positive ("TRUE") result, one or more actions 1330 may be specified to be carried out by some element of media service gateway 135. The action may be hardcoded, or may be computed based on the attributes described herein and other variables and constants.

As described herein, the action 1330 may include an instruction to reduce the bit rate of a media session, for example by transcoding media session content or by implementing an adaptive streaming action, such as limiting the available operating points.

A policy engine may determine policy actions for media traffic, which may include a plurality of actions. For example, a policy action may include access control, a transcoding action, a re-multiplexing action, a request-response modification action, a client-aware buffer-shaping action, an adaptive streaming control action, inserting or replacing content in the media session, in addition to the more conventional per-flow actions such as marking, traffic policing/shaping, and the like. Media-centric policy actions may be further scoped, that is, applied only to specific media applications, devices, resolutions, locations, time-of-day, or constrained, that is, subject to minimum/maximum bit rate, frame rate, QoE targets, resolution, and the like.

Priorities 1340 can be integer values for prioritizing policy rules relative to each other. This provides a basic mechanism for resolving policy conflicts. Conflicts may occur in the case where a media session satisfies the conditions of multiple policy rules and the actions associated with those rules are incompatible. By giving rules different priorities, the policy engine can select the policy rule with the highest priority.

Policies can either be used in a stand-alone fashion or aggregated into policy groups to perform more elaborate that is, subject to minimum/maximum bit rate, frame rate, QoE targets, resolution, and the like.

Priority values for prioritizing policy rules relative to each other can be assigned to each policy rule as integer values or can be established based on another hierarchical or rules-based approach. This provides a basic mechanism for resolving policy conflicts. Conflicts may occur in the case where a media session satisfies the conditions of multiple policy rules and the actions associated with those rules are incompatible. By giving rules different priorities/priority values, the policy engine can select the policy rule with the highest priority or otherwise result conflicts in a structured way.

FIGS. 6A and 6B show a subset of a simplified and partial grammar in pseudo-Extended Backus-Naur Form (EBNF) notation for a media-capable policy language in an embodiment. EBNF notation consists of terminal symbols and non-terminal production rules which govern how terminal symbols are combined into a legal sequence. Keywords are shown in bold. Vertical bars represent alternatives. Square brackets represent optional fields. Capitalized terms are non-terminals and represent values that can be expressed using regex like notation or may represent enumerated constants.

This figure illustrates basic expression composition and example expressions for sessions, video, audio, application, subscriber, device, network/location and flow-based attributes and media-related actions. For brevity, non-terminal symbols are not fully expanded but should be easily understood. For example, VIDEO_CODEC may be expanded as follows:

```
VIDEO_CODEC: _UNKNOWN | _NOT_PRESENT | _VCODEC_H263 | _VCODEC_H264 |
_VCODEC_MPEG4 | _VCODEC_SORENSON_VIDEO | _VCODEC_VP3 | _VCODEC_VP6 |
_VCODEC_VC1 | _VCODEC_H261 | _VCODEC_MPEG1 | _VCODEC_MPEG2 |
_VCODEC_WMV | _VCODEC_SORENSON_SPARK | _VCODEC_VP7 | _VCODEC_VP8 |
_VCODEC_VP9 | _VCODEC_H265
``` functions. Stand-alone policies are called policy rules. Policy groups are aggregations of policy rules, or aggregations of policy groups. Policy groups can model intricate interactions between objects that have complex interdependencies, e.g. to create high level service-based policies such as service prioritization for a 3rd party video delivery service such as Netflix or YouTube. These groups may be nested, to represent a hierarchy of policies.

It will be appreciated that a virtually unlimited variety of policy rules can be created by crafting logic expressions using the attributes described herein and other variables and constants.

Returning now to FIG. 4, when a rule is evaluated and returns a positive ("TRUE") result, one or more actions may be specified to be carried out by some element of media policy decision and control point 525. The action may be based on media session attributes and other variables and constants.

Policy actions which may be supported on a media session include access control (i.e., whether to permit or deny the media session), re-multiplexing, request-response modification, client-aware buffer-shaping, transcoding, adaptive streaming control, inserting or replacing content in the media session, in addition to the more conventional per-flow actions such as marking, traffic policing/shaping, and the like. Media-centric policy actions may be further scoped, that is, applied only to specific media applications, devices, resolutions, locations, time-of-day, or constrained, Note that these are simplified examples for illustration purposes only. Pseudo-infix notation has been used in these examples.

As previously discussed, media-centric policies can be used to control the delivery of media sessions from a media server to a client. A media-centric policy may define one or more conditions that can be evaluated based on media-specific and non-media-specific attributes. In general, a media-centric policy consists of a rule that has a condition to be satisfied and one or more actions that can be applied when the condition is satisfied. A condition is expressed in the form of conditional logic tested against media session attributes. For example, one condition may be expressed in prose as "bitrate is greater than 1500 kbps" although it will be understood that generally the conditions may be expressed in a machine-readable form such as computer-interpretable code in an Extensible Markup Language (XML) file or entered via a command shell environment such as a command line interface (CLI). Accordingly, if this condition is satisfied, an action associated with the rule (e.g., "transcode to bitrate of 500 kbps") may be implemented, as described herein.

Accordingly, policy objects are structured as rules that can be contained within groups that in turn can be nested together. A policy rule can consist of a condition and associated action that may be applied when the whole expression is true. A policy condition consists of a Boolean expression that evaluates to true or false. A policy expression consists of terms grouped together using logical operators (and, or, not). A policy term is a relational expression that evaluates a particular media session attribute, a location-wide variable, or some pre-defined system values (e.g. time of day).

The default condition may consist of a single term that evaluates to true or false. A policy rule needs to be reachable by a policy group in order to be evaluated. Policy groups have a match clause that specifies how many of the contained policy objects need to evaluate as true for all the associated actions to be applied:

Match any: the first match is selected
Match all: all need to be true to be selected
Match most: all those one that are true are selected A policy group is evaluated in the order in which policy objects are inserted (or moved), that implicitly define the evaluation priority. Nested policy groups are evaluated first, depth-first.

FIG. 7 shows an example policy whereby all OTT video traffic will be transcoded to a target visual QoE during three defined busy hours. This policy illustrates an example of a policy governed by conditions that may be dynamically triggered in the middle of a media session. It also illustrates how policies can be named using alphanumeric characters ('qoe-normalization').

Suppose that a media session watching any OTT video (e.g. YouTube) is started outside of the first busy hour. Initially no policy will be applied. During any of the busy hours, e.g. the first, the video session will be transcoded to a presentation QoE of 3.0 (i.e. a lower visual quality and therefore reduced bandwidth). This will be dynamically triggered at 12:00 in the case of the first busy hour wherein the transcoding may be suspended (if the device/player can accept changing back to the original operating point) at 13 h15 if the session is still active.

FIG. 8 shows another example, which includes three rules which control three different types of adaptive streaming protocols, Apple's HTTP Live Streaming (HLS), Netflix's adaptive streaming protocol, and Microsoft's Silverlight streaming protocol. Each rule contains an identifying name, a condition to be satisfied based on the streaming protocol, and an action to perform if the condition is true. This policy also illustrates how policy groups may be used to select among alternative policies based on some matching criteria, against almost any of the previously defined media-specific and non-media-specific attributes. The match-any clause is used to select among alternative policies. Alternatively, a match-most criterion allows for multiple rules within a group to simultaneously match. Note that conflict resolution is always done by selecting the action of the highest priority rule when clashing.

Figure 9:
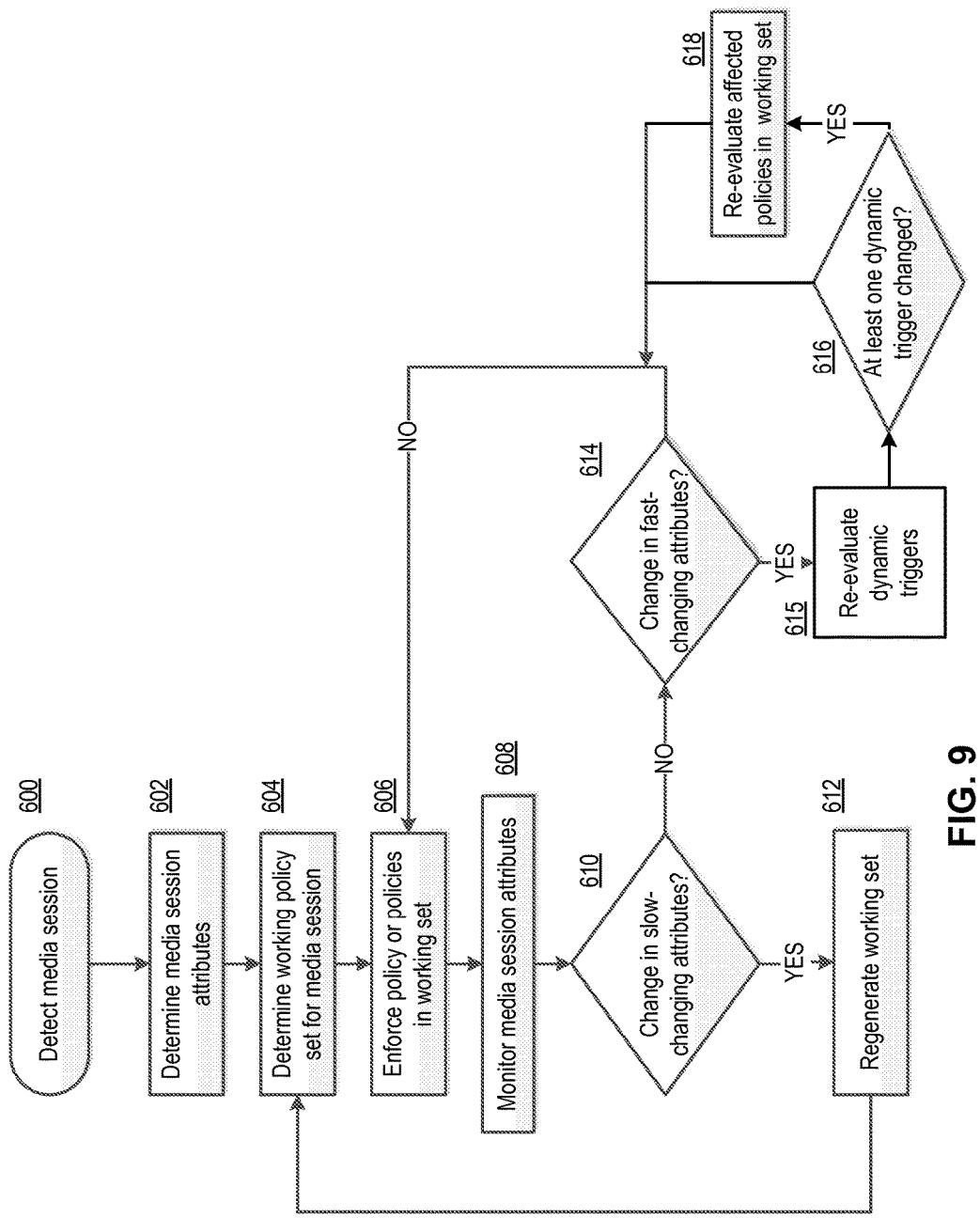
FIG. 9 is an example process flow in accordance with an example embodiment.
Figure 10:
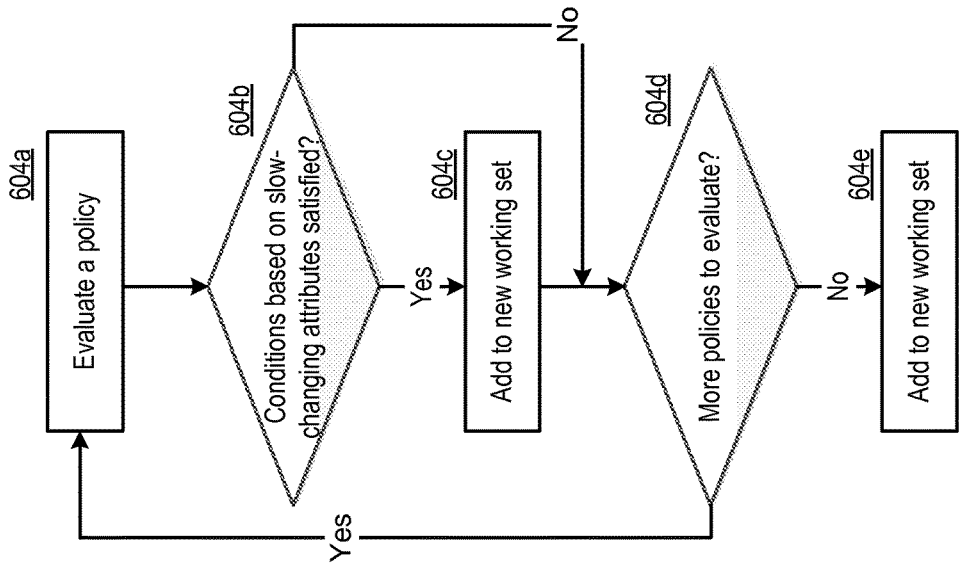
FIG. 10 is an example process flow in accordance with an example embodiment.

FIGS. 9-10 represent an example process flow in accordance with an example embodiment. In particular a method is presented for use in conjunction with one or more functions and features presented in conjunction with FIGS. 1-8. The method models media-specific and non-media-specific attributes of media sessions around which media policy may be evaluated and media-centric policy actions may be applied. In addition to media-specific attributes, non-media-specific attributes such as time, location and network load are part of the model to allow interactions between them and to respond to real world conditions. This invention provides the foundation to manage individual media sessions and hence control aggregate media traffic behavior through a real-time control system.

Moreover, while media-centric policies are evaluated at the beginning of a new media session, once identified, they are also beneficially evaluated throughout the entire session lifetime whenever the policy configuration, some of the session's underlying attributes, or some fast-changing dependent trigger variable change (e.g. QoE, time-of-day). Thus, policy re-evaluation is fully dynamic and the resulting actions, depending on specific restrictions, apply immediately.

In step 600, when a traffic flow has been identified that could potentially be media (by the M-PEP 510, the M-PDP 550, or another entity), the M-PDP 550 is informed and prepares for further evaluation processing. In step 602, the flow is further inspected pending the necessary attributes that would allow policies to be evaluated. The attributes may include slow-changing attributes, fast-changing attributes, or both, as described herein.

Step 604 of determining a working policy set for the media session, is shown. An example of this step 604 is presented in conjunction with steps 604a-e presented in FIG. 10. In step 604a, when the media session attributes have been detected, the M-PDP 550 may begin to construct the working set of policies. It may do so by evaluating all policies from the general set of media-centric policies to generate a new working set of policies for a given media session, beginning with a first policy and iterating until all policies within the general set have been initially evaluated. Evaluation may be done in a prioritized order, for example, based on priorities 1340. Evaluation can be carried out by identifying one or more rules applicable to each session policy and evaluating the expressions defined by those rules against the slow-changing or fast-changing attributes associated with the media session and applicable to the expressions. Further examples are described in U.S. Utility application Ser. No. 13/894,797, entitled METHODS AND SYSTEMS FOR DYNAMIC POLICY EVALUATION, filed on May 15, 2013.

At 604b, the expressions of the current policy under consideration may be evaluated. For example, evaluation may be performed using a quaternary logic approach. In the quaternary logic approach, conventional binary logic states ("TRUE", "FALSE") can be supplemented with additional "SOFT" states (e.g., "SOFT-TRUE" and "SOFT-FALSE"). This allows a rule expression to produce a "TRUE", "SOFT-TRUE", "SOFT-FALSE" or "FALSE" result. A policy that is or may be satisfied during the lifetime of the media session, for example because a slow-changing attribute causes an expression to always evaluate as "TRUE", or because an expression contains a fast-changing attribute which may sometime during the session evaluate as "TRUE", can be included in the new working set. Therefore, policies whose rules produce a "TRUE", "SOFT-TRUE" or "SOFT-FALSE" result can be selected for inclusion in the new working set at 604c.

In some other embodiments, evaluation can be performed using a similar ternary logic approach, in which there are three states ("TRUE", "SOFT-FALSE" and "FALSE"), although this may be less clear from a descriptive point-of-view. A session policy that is unlikely to be satisfied during the lifetime of the media session, for example because a slow-changing characteristic causes an expression to always evaluate as "FALSE", can be eliminated, either discarded or ignored from the new working set.

Accordingly, the new working set of policies will generally be a subset compared to the general set of media session policies, and will have fewer policies as a result. In the quaternary logic approach, the expressions of the policies remaining in this working set either fully match the media session attributes ("TRUE") or partially match ("SOFT- TRUE", "SOFT-FALSE"), such that at least the sub-expressions depending on slow-changing attributes of the media session will evaluate as "TRUE". For those that partially match, the Boolean state ("TRUE", "FALSE") of each dynamic trigger (each sub-expression that depends on a fast-changing attribute) may be recorded. For example, a list of dynamic triggers in the working set may be recorded so that whenever a fast-changing attribute changes, it is possible to quickly determine if one or more policies in the working set will be impacted by this change.

At 604*d*, the M-PDP 550 determines whether there are any additional session policies in the original set to be evaluated and, if there are, returns to 415 to evaluate the next selected session policy. If there is already a current working set (e.g., because a working set was previously generated), then at step 604*e*, media service gateway 135 replaces the current working set with the new working set. In some embodiments, this replacement can be performed using a merge operation as described below.

For example, in some embodiments, the merging and enforcement of a new working set A may be performed in an optimized way using a merge operation on a current working set B. Beginning with set B, policies belonging to the set B-(A∩B) may be removed from the current working set and dis-enforced, those policies belonging to set A∩B may continue to be enforced and retained in the current working set, and new policies belonging to set A-(A∩B) may be added to the current working set and enforced.

Returning to FIG. 9, if a rule matches the policy conditions then the defined action for the policy rule is applied to the media session by the M-PEP 510 for enforcement as shown in step 606. M-PEP 510 may enforce one or more selected policies from the current working set of session policies. In the quaternary logic approach in particular, those policies with rule expressions that evaluate to "TRUE" or "SOFT-TRUE" can be enforced. Thus, while a session policy may be included in the working set even if is not satisfied by a fast-changing characteristic, it may not be enforced (e.g., those policies with rule expressions that evaluate to "SOFT-FALSE"). Accordingly, actions associated with a session policy whose rules are not satisfied will not be carried out.

In step 608, the method determines if any of the conditions are dynamic in nature and may need monitoring and/or re-evaluation during the lifetime of the session or that slow-changing attributes that are expected to be session-static have changed. Monitoring may occur at preselected intervals, for example once every second. Optionally, monitoring may occur in response to an event received from an external source.

If the method determines in step 610 that slow-changing attributes change, the method proceeds to step 612 to regenerate the working set and return to step 604 to determine a new working set. This may involve conceptually merging a new working set with the current working set, similar to 604*e*.

If no slow-changing attributes have changed and the method determines in step 614 that fast-changing attributes have changed, then it is possible that an action that was previously false may now evaluate to true and hence a new action may be applied or removed. The described embodiments allow for session policies to be initially selected regardless of the current state of fast-changing attributes, but rather based on the likelihood of a rule expression to potentially evaluate positively during the lifetime of a session. This initial pre-selection need not be performed at the start of the media session, but once performed allows for such incremental re-evaluation.

At step 615, dynamic triggers that depend on this attribute are re-evaluated. Since the re-evaluation only affects the dynamic triggers in each rule expression, the full rule expressions need not be re-evaluated. Rather, the rule expressions can be partially re-evaluated to consider only the affected dynamic triggers. In some embodiments, the dynamic triggers may be stored in a separate data structure and associated with the full rule expression, to facilitate fast re-evaluation.

At step 616, if one of the re-evaluated dynamic triggers has changed, any policies within the working set that contain the dynamic trigger are re-evaluated.

In step 618, the method re-evaluates the media sessions to ensure that the policy is still valid and changes the enforcement actions as required in step 606.

In other cases, the method may also receive triggers from external components or systems. The most basic example of this is when the policy rules definition is modified by the administrator and hence the policies need re-evaluation.

Figure 11:
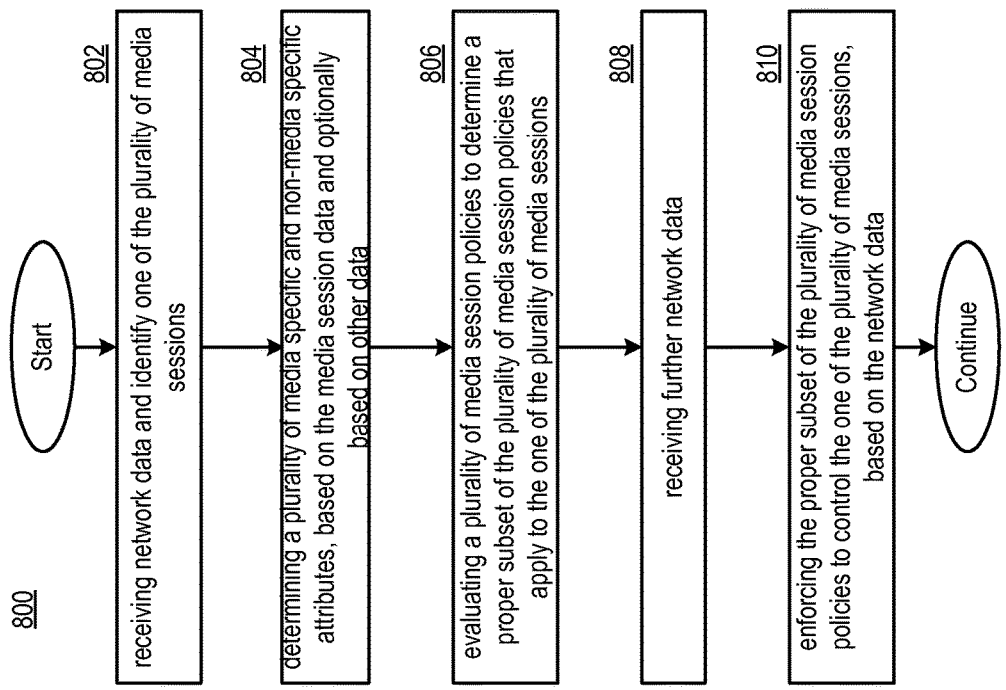
FIG. 11 is an example process flow in accordance with an example embodiment.

FIG. 11 is an example process flow in accordance with an example embodiment. In particular, a method 800 is presented for use with one or more functions and features presented in conjunction with FIGS. 1-10. Step 802 includes receiving network data and identifying media session data corresponding to one of the plurality of media sessions within the network data. Step 804 includes determining a plurality of media-specific and non-media-specific attributes, based on the media session data. Step 806 includes evaluating a plurality of media-centric policies to determine a proper subset of the plurality of media-centric policies that apply to the one of the plurality of media sessions. Step 808 includes receiving further network data. Step 810 includes enforcing the proper subset of the plurality of media-centric policies to control the one of the plurality of media sessions, based on the network data.

In an embodiment, each of the plurality of media-centric policies include: a rule that includes a logical expression that defines when the rule is satisfied; and an action, associated with the rule.

Step 810 can include, for each media-centric policy in the proper subset of the plurality of media-centric policies: evaluating the logical expression to determine when the rule is satisfied; and performing the action associated with the rule when the rule is satisfied.

Step 810 can include, for each media-centric policy in the proper subset of the plurality of media-centric policies: evaluating the logical expression to determine when the rule is satisfied; performing the action associated with the rule when the rule is satisfied, based on the priority associated with the rule.

Figure 12:
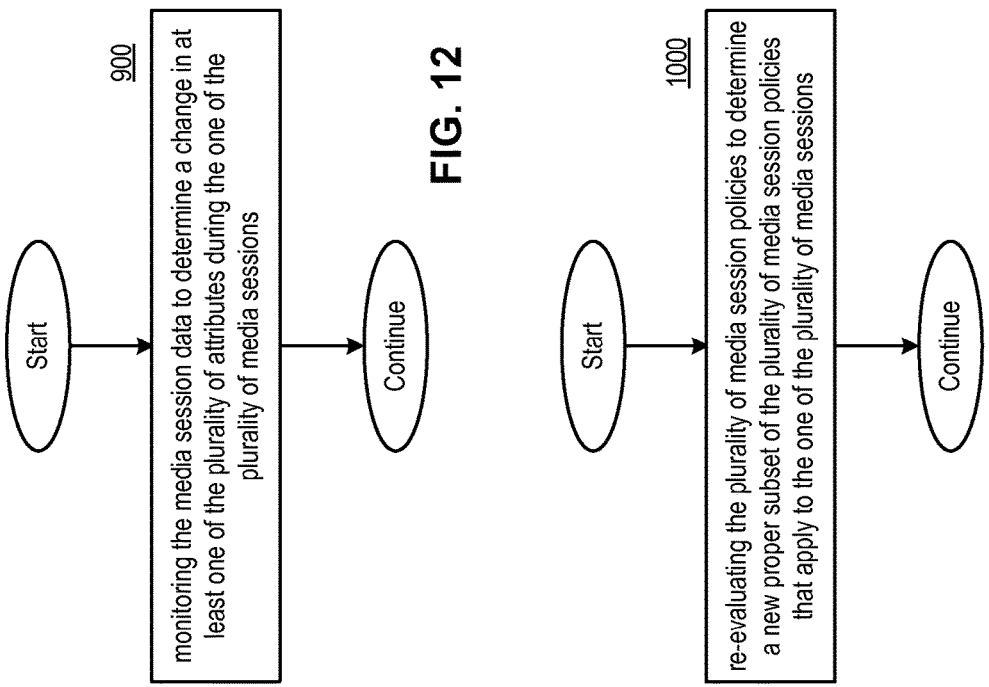
FIG. 12 is an example process flow in accordance with an example embodiment.

FIG. 12 is an example process flow in accordance with an example embodiment. In particular, a method is presented for use with one or more functions and features presented in conjunction with FIGS. 1-11. Step 900 includes monitoring the media session data to determine a change in at least one of the plurality of media-specific and non-media-specific attributes during the one of the plurality of media sessions. In addition one of the plurality of media sessions can be controlled based on the changes in the at least one of the attributes.

In an embodiment, the plurality of media session attributes include a plurality session-static attributes and a plurality of session-dynamic attributes. Step 900 can include determining when at least one of the plurality of session-static attributes has changed during the one of the plurality of media sessions. When the at least one of the plurality of session-static attributes has not changed and at least one of the plurality of session-dynamic attributes has changed during the one of the plurality of media sessions, the method can control the one of the plurality of media sessions based on the changes in the at least one of the media session attributes by evaluating an impact of the change in the at least one of the session-dynamic attributes on the proper subset of the plurality of media-centric policies, and enforcing the proper subset of the plurality of media-centric policies based on the impact.

Figure 13:
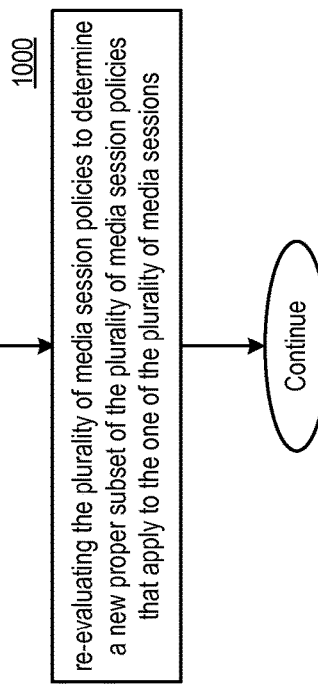
FIG. 13 is an example process flow in accordance with an example embodiment.

FIG. 13 is an example process flow in accordance with an example embodiment. In particular, a method is presented for use with one or more functions and features presented in conjunction with FIGS. 1-12. When the at least one of the plurality of session-static attributes has changed during the one of the plurality of media sessions, the method includes step 1000 of re-evaluating the plurality of media-centric policies to determine a new proper subset of the plurality of media-centric policies that apply to the one of the plurality of media sessions. In this case, the method can control the one of the plurality of media sessions based on the changes in the at least one of the media session attributes by enforcing the new proper subset of the plurality of media-centric policies.

Figure 14:
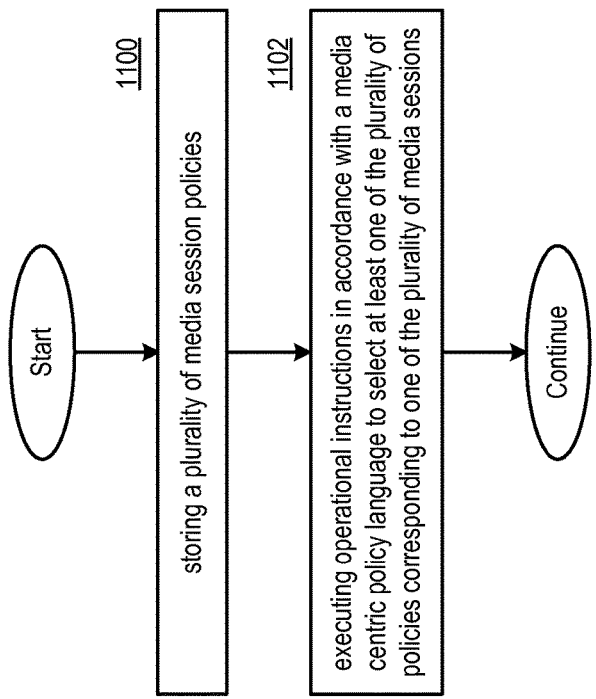
FIG. 14 is an example process flow in accordance with an example embodiment.

FIG. 14 is an example process flow in accordance with an example embodiment. In particular, a method is presented for use with one or more functions and features presented in conjunction with FIGS. 1-13. Step 1100 includes storing a plurality of media-centric policies. Step 1102 includes executing operational instructions in accordance with a media centric policy language to select at least one of the plurality of policies corresponding to one of the plurality of media sessions.

In an embodiment, the media centric policy language is a rule-based language that operates based on a plurality of attribute types, wherein each attribute type has a corresponding plurality of attribute values. As previously discussed, the plurality of attribute types can include a session attribute and the corresponding plurality of attribute values can include: a media session duration, a media session quality of experience, a media session time of day, a media session day of week, and/or a media session container format. The plurality of attribute types can include a video attribute and the corresponding plurality of attribute values include: a video codec identifier, a video resolution, a video bit rate, and/or a video operating point. The plurality of attribute types can include an audio attribute and the corresponding plurality of attribute values can include: an audio codec identifier, a number of audio channels, an audio bit rate, and/or an audio sampling rate. The plurality of attribute types can include a subscriber attribute and the corresponding plurality of attribute values can include: a subscriber identifier, a data plan and/or a subscriber tier. The plurality of attribute types can include a device attribute and the corresponding plurality of attribute values can include: a display size, a display resolution, a device identifier, an operating system identifier, a browser identifier, and/or a media player identifier. The plurality of attribute types can include a network attribute and the corresponding plurality of attribute values can include: a network status, a location identifier, and/or an access type identifier. The plurality of attribute types can include an application attribute and the corresponding plurality of attribute values can include: a site identifier, a service identifier, a content data network identifier, an edge server identifier, an origin server identifier, and/or a streaming protocol identifier.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

The invention claimed is:

1. A system for use in a network, the system configured to:
store a plurality of media-centric policies in a policy repository, the policy repository comprising a rules engine for evaluating policy rules, wherein the policy repository is part of a media policy decision and control point, implemented via one or more processors coupled to one or more memory elements, that provides streaming media in a plurality of media sessions between a media source and a corresponding plurality of client devices,
wherein the media policy decision and control point comprises a media policy enforcement point that forwards data packets associated with data sessions of each client device to and from an operator network with minimal latency;
execute operational instructions in accordance with a media centric policy language to select a proper subset of the plurality of media-centric policies corresponding to one of the plurality of media sessions,
wherein the media-centric policy language expresses at least one of: operator preferences, operator goals, or operator constraints, the media centric policy language being a rule-based language that facilitates media-centric policy decision and enforcement based on a plurality of attribute types, wherein each attribute type has a corresponding plurality of attributes, the plurality of attribute types including: a subscriber attribute type, a device attribute type, an application attribute type, and a flow-based attribute type,
the plurality of attributes corresponding to the subscriber attribute type include at least one of: a subscriber identifier, a time-based subscriber quota, a volume-based subscriber quota, a subscriber data plan, a subscriber tier, or a subscriber group, the plurality of attributes corresponding to the device attribute type include at least one of: a device display size, a device display resolution, a device type, a device operating system, a browser identifier, a user agent, or a media player identifier, the plurality of attributes corresponding to the application attribute type include at least one of: a media site, a media service, a content data network, an edge server, an origin server, a container format, a container encryption status, or a streaming protocol type, the plurality of attributes corresponding to the flow-based attribute type include at least one of: a VLAN identifier, an IP address, a port number, a transport protocol, a VPN tunnel, a TOS value, or a DSCP value; and enforce by the media policy enforcement point the selected media-centric policies to control the one of the plurality of media sessions based on the attributes.

2. The system of claim 1 wherein the plurality of attribute types include a session attribute type and the plurality of attributes corresponding to the session attribute type include at least one of: a media session network time, a media session streaming time, a media session clip duration, a media session streamed duration, a media session watched duration, a media session quality of experience measure, a media session time of day, a media session day of week, or a media session genre.

3. The system of claim 1 wherein the plurality of attribute types include a video attribute type and the plurality of attributes corresponding to the video attribute type include at least one of: a video codec, a video codec profile, a video stream encryption status, a video resolution, a video bit rate, or a video operating point.

4. The system of claim 1 wherein the plurality of attribute types include an audio attribute type and the plurality of attributes corresponding to the audio attribute type include at least one of: an audio codec, an audio codec profile, an audio stream encryption status, a number of audio channels, an audio bit rate, an audio sampling rate, or an audio operating point.

5. The system of claim 1 wherein the plurality of attribute types include a network attribute type and the plurality of attributes corresponding to the network attribute type include at least one of: a network load level status, a network congestion status, a network location, or a network access type.

6. A method of streaming media in a plurality of media sessions, the method comprising:

storing a plurality of media-centric policies in a policy repository, the policy repository comprising a rules engine for evaluating policy rules, wherein the policy repository is part of a media policy decision and control point, implemented via one or more processors coupled to one or more memory elements, that provides streaming media in a plurality of media sessions between a media source and a corresponding plurality of client devices, wherein the media policy decision and control point comprises a media policy enforcement point that forwards data packets associated with data sessions of each client device to and from an operator network with minimal latency;

executing operational instructions in accordance with a media centric policy language to select a proper set of the plurality of media-centric policies corresponding to one of the plurality of media sessions, wherein the media-centric policy language expresses at least one of: operator preferences, operator goals, or operator constraints, the media centric policy language being a rule-based language that facilitates media-centric policy decision and enforcement based on a plurality of attribute types, wherein each attribute type has a corresponding plurality of attributes, the plurality of attribute types including : a subscriber attribute type, a device attribute type, an application attribute type, and a flow-based attribute type, the plurality of attributes corresponding to the subscriber attribute type include at least one of: a subscriber identifier, a time-based subscriber quota, a volume-based subscriber quota, a subscriber data plan, a subscriber tier, or a subscriber group, the plurality of attributes corresponding to the device attribute type include at least one of: a device display size, a device display resolution, a device type, a device operating system, a browser identifier, a user agent, or a media player identifier, the plurality of attributes corresponding to the application attribute type include at least one of: a media site, a media service, a content data network, an edge server, an origin server, a container format, a container encryption status, or a streaming protocol type, the plurality of attributes corresponding to the flow-based attribute type include at least one of: a VLAN identifier, an IP address, a port number, a transport protocol, a VPN tunnel, a TOS value, or a DSCP value; and enforcing by the media policy enforcement point the selected media-centric policies to control the one of the plurality of media sessions based on the attributes.

7. The method of claim 6 wherein the plurality of attribute types include a session attribute type and the plurality of attributes corresponding to the session attribute type include at least one of: a media session network time, a media session streaming time, a media session clip duration, a media session streamed duration, a media session watched duration, a media session quality of experience measure, a media session time of day, a media session day of week, or a media session genre.

8. The method of claim 6 wherein the plurality of attribute types include a video attribute type and plurality of attributes corresponding to the video attribute type include at least one of: a video codec, a video codec profile, a video stream encryption status, a video resolution, a video bit rate, or a video operating point.

9. The method of claim 6 wherein the plurality of attribute types include an audio attribute type and the plurality of attributes corresponding to the audio attribute type include at least one of: an audio codec, an audio codec profile, an audio stream encryption status, a number of audio channels, an audio bit rate, or an audio sampling rate.

10. The method of claim 6 wherein the plurality of attribute types include a network attribute type and the plurality of attributes corresponding to the network attribute type include at least one of: a network load level status, a network congestion status, a network location, or a network access type.

11. A system for use in a network that provides streaming media in a plurality of media sessions between a media source and a corresponding plurality of client devices, the system configured to:

store a plurality of media-centric policies in a policy repository, the policy repository comprising a rules engine for evaluating policy rules, wherein the policy repository is part of a media policy decision and control point, implemented via one or more processors coupled to one or more memory elements, that provides streaming media in a plurality of media sessions between a media source and a corresponding plurality of client devices, wherein the media policy decision and control point comprises a media policy enforcement point that forwards data packets associated with data sessions of each client device to and from an operator network with minimal latency;

execute operational instructions in accordance with a media centric policy language to select a proper set of the plurality of media-centric policies based on evaluation of at least one logical expression included in rules associated with the plurality of media-centric policies, wherein the media-centric policy language expresses at least one of: operator preferences, operator goals, or operator constraints, the media centric policy language being a rule-based language that facilitates media-centric policy decision and enforcement based on a plurality of attribute types, wherein each attribute type has a corresponding plurality of attributes, the plurality of attribute types including : a subscriber attribute type, a device attribute type, an application attribute type, and a flow-based attribute type, the plurality of attributes corresponding to the subscriber attribute type include at least one of: a subscriber identifier, a time-based subscriber quota, a volume-based subscriber quota, a subscriber data plan, a subscriber tier, or a subscriber group, the plurality of attributes corresponding to the device attribute type include at least one of: a device display size, a device display resolution, a device type, a device operating system, a browser identifier, a user agent, or a media player identifier, the plurality of attributes corresponding to the application attribute type include at least one of: a media site, a media service, a content data network, an edge server, an origin server, a container format, a container encryption status, or a streaming protocol type, the plurality of attributes corresponding to the flow-based attribute type include at least one of: a VLAN identifier, an IP address, a port number, a transport protocol, a VPN tunnel, a TOS value, or a DSCP value; and control at least one of the plurality of media sessions based on the selected media-centric policies and further based on feedback extracted from monitoring of the plurality of media sessions.

* * * * *